(12) United States Patent
Fraser et al.

(10) Patent No.: US 8,257,589 B2
(45) Date of Patent: Sep. 4, 2012

(54) POLYMERIC FOAM COALESCING AGENT

(75) Inventors: Serge Fraser, St-Joseph de Coleraine (CA); Richard Blain, Granby (CA); Xuejun Chen, Calgary (CA)

(73) Assignee: Prosep Inc., Montreal, Quebec (CA)

( * ) Notice: Subject to any disclaimer, the term of this patent is extended or adjusted under 35 U.S.C. 154(b) by 250 days.

(21) Appl. No.: 12/663,614

(22) PCT Filed: Jun. 18, 2008

(86) PCT No.: PCT/CA2008/001173
§ 371 (c)(1),
(2), (4) Date: Jun. 25, 2010

(87) PCT Pub. No.: WO2008/154746
PCT Pub. Date: Dec. 24, 2008

(65) Prior Publication Data
US 2010/0267852 A1    Oct. 21, 2010

(30) Foreign Application Priority Data
Jun. 18, 2007   (CA) .................................... 2592190

(51) Int. Cl.
*B01D 24/00*   (2006.01)
*C08J 9/00*    (2006.01)

(52) U.S. Cl. ............................ 210/285; 521/50; 521/143

(58) Field of Classification Search ................. 210/285; 528/49; 521/143, 146, 155, 182
See application file for complete search history.

(56) References Cited

U.S. PATENT DOCUMENTS

| 3,947,362 | A | | 3/1976 | Etani |
| 4,102,785 | A | | 7/1978 | Head et al. |
| 4,552,903 | A | * | 11/1985 | Nafziger et al. ............. 521/137 |
| 5,239,040 | A | * | 8/1993 | Kozlowski ...................... 528/49 |
| 7,416,667 | B2 | * | 8/2008 | Benachenou et al. ........ 210/285 |
| 2004/0112823 | A1 | | 6/2004 | Benachenou et al. |
| 2006/0049108 | A1 | | 3/2006 | Veronneau et al. |
| 2007/0078193 | A1 | * | 4/2007 | Gilder et al. .................... 521/99 |

FOREIGN PATENT DOCUMENTS

| CA | 1093478 | 1/1981 |
| CA | 1167774 | 5/1984 |
| CA | 2421076 | 3/2006 |
| WO | WO 2004/087286 A1 | 10/2004 |
| WO | WO 2006/110972 A1 | 10/2006 |

OTHER PUBLICATIONS

PCT/CA2008/001173 International Search Report.

* cited by examiner

*Primary Examiner* — Randy Gulakowski
*Assistant Examiner* — Kara Boyle
(74) *Attorney, Agent, or Firm* — Fay Sharpe LLP

(57) ABSTRACT

A coalescing agent for facilitating the separation of a non-aqueous phase from an aqueous phase of an aqueous medium, said agent consisting of particles of a polymeric foam material having: an IFD no. of 40 or higher (i.e. at least 40); a BR no. of 35 or higher (at least 35); a SF no. of 1.8 or higher (i.e. at least 1.8) and a density of 42 kg/m$^3$ or less.

8 Claims, 17 Drawing Sheets

POLYMERIC FOAM COALESCING AGENT

The present invention relates to coalescing type materials as well as their use for the treatment of a liquid (e.g. a liquid medium) comprising two or more components whereby two or more liquid components thereof may be separated or isolated one from the other. The coalescing type materials may, for example, be used for the treatment of an oil/water, medium or substance (e.g. an emulsion) for the separation of oil from water, the oil/water medium (i.e. emulsion), being a liquid, medium or substance, wherein oil is the dispersed phase and water is the continuous phase (i.e. an emulsion wherein water is the continuous phase).

It is to be understood herein that the term "oil" means any organic liquid which is substantially immiscible with water and which either has a specific gravity appreciably from that of water or which exhibits such difference when the specific gravity of the water is altered by a solute dissolved therein.

Oil from water separators are also known and include, for example, coalescing separators (see for example Canadian patent nos. 1,093,478 and 1,167,774 and U.S. Pat. No. 4,102,785). For example one means for the separation of oil from an oil/water medium (i.e. emulsion) involves the use of a coalescing type filter or separator (e.g. cartridge) designed for "inside to outside flow". For this "inside to outside flow" technique an oil/water medium (i.e. emulsion) may be passed (radially) through the body of an annular coalescent bed from "inside to outside". The annular coalescent bed may be made up of a coalescent (particulate) or adsorbing media. As the oil/water medium passes through the coalescent bed oil droplets are coalesced and an oil phase separates from the water passing through the coalescent bed. Thus oil from water separator may comprise a cartridge assembly having an annular coalescing section to cause emulsified liquids to form readily removable oil droplets in the flow. As may be appreciated various wall elements of these known separators are liquid permeable. An alternate coalescing type filter or separator is described in Canadian Patent no. 2,421,076 and in U.S. patent application Ser. No. 10/363,028 published under no. 20040112823; this alternate separator exploits an axial like flow. The invention will, however, in particular be described herein by way of example only with respect to a cartridge type separation system (see figures mentioned below).

It is known to exploit various kinds of particulate type materials for adsorbing or coalescing a non-aqueous phase, typically crude oil or a derivative thereof, such as gasoline, diesel fuel, lubricating oil, and the like. For this purpose, it is has been indicated that it is possible to exploit a wide range of polymeric or polymeric type substances for use as adsorbents and/or coalescing and/or separating agents. These substances include: polyethylene; polypropylene; polyisocyanurate; polyurethane; particles of polyurethane foam; silane cross linked polyolefin; polymethyl methacrylate; particles fibreglass; wool; cork; styrofoam; polyester and/or Cotton.

Coalescing type materials or compositions for liquid treatment (i.e. liquid/liquid separation) are, for example, described in U.S. patent application Ser. No. 10/363,028 (carrying a publication date of Jun. 17, 2004 and a U.S. publication no. 20040112823), U.S. patent application Ser. No. 10/541,180 (carrying a publication date of Mar. 9, 2006 and a U.S. publication no. 20060049108) and in international patent application no. PCT/CA2005/000585 (carrying a publication date of Oct. 26, 2006 and a publication no. WO 2006/110972). The entire contents of these patent documents is incorporated herein by reference.

Until recently it was considered that the chemical structure of the substance or material used to make adsorbent, coalescing or separating media determined the adsorptive, coalescing or separating characteristics of such media. It has, however, come to be recognized in accordance with the present invention that certain physical attributes of the media play an important role in relation to the separation of one liquid from another.

Thus, for example, the physical aspects of coalescing type media need to be further developed in relation to their exploitation for (liquid/liquid) separation systems wherein there is a constant flow of liquid across the coalescing media. The flow rate of liquid may, for example, range up to 80 m/h or more.

Advantageously, a coalescing media should be able to support the above mentioned resulting pressure drop across the coalescing media (for a reasonable or predetermined time period) without any (undesired) leaking of untreated or partially treated fluid medium through the coalescing media, i.e. the coalescing media advantageously should be able to resist fluid medium breakthrough that would allow the fluid to go around the media and avoid the adsorbing, coalescing and desorbing process.

International patent application no, PCT/CA2005/000585 (referred to above) indicates that then known coalescing media were not particularly designed to support pressure drops and to resist deformation and compacting when in contact with such a flow. It is indicated in the application that a (particulate) coalescent medium could, for example, react to the pressure drop that comes with the constant flow by physically rearranging itself (i.e. by compaction) so as to create unwanted open space(s) for the flow to pass therethrough. As a result of this rearrangement the target fluid in the flow over time may start to undesirably leak from the media without the desired contact (of oil) with the coalescing media. In other words, to the extent that leaking (i.e. breakthrough) may occur, process (oil) recovery efficiency may be reduced in kind.

International patent application no. PCT/CA2005/000585 (mentioned above) does, however, describe a possible solution to the problem of leaking. Thus this international application suggests the exploitation of a media which in addition to a coalescing media component (including a powder) also comprises a fiber (reinforcement) component.

There is, however, a continuing need for coalescing media which could avoid or minimize leaking problems (over time). It would thus, for example, be advantageous to have other or alternate means for dealing with the problem of leaking. It would in particular be advantageous to be able to exploit a coalescence media which could attenuate the problem of leaking and which would not require the presence of a fiber (reinforcement) component. The removal of a fiber component as part of a coalescing medium could, for example, facilitate the manufacture of a coalescing type cartridge for an oil-from-water separator system wherein the cartridge may be provided with an annular coalescent bed comprising the coalescing medium (as shall be described herein).

It is to be understood herein that the expression Indentation Force Deflection no. (i.e. IFD no.)

a reference to a measure of the load bearing capacity of a flexible polymeric foam material (e.g. such as in particular a polyurethane foam). It is to be further to be understood herein that in relation to the IFD no. reference may be made to Test Method ASTM D3574 which sets forth Standard Test Methods for Flexible Cellular Materials—Slab, Bonded, and Molded Urethane Foams; for the purposes herein the Test Method ASTM D3574 may be used or adapted as needed or necessary for other types of foam materials such as polystyrene foam, polypropylene foam, polyester foam, and polyethylene foam and the like. Generally the IFD no. is measured as the force (in pounds) required to compress a 50 square inch circular indentor foot into a 4 inch thick sample, typically 15 inches square or larger, to a stated (i.e. predetermined) percentage (e.g. 25%) of the sample's initial height (i.e. thickness). IFD is also known as or called "ILD" (Indentation Load Deflection.)

It is to be understood herein that word Hysteresis is a reference to the ability of foam to maintain original support characteristics after flexing. It is to be understood herein that Hysteresis is the percent of 25% IFD loss measured as a compression tester returns to the normal (25% IFD) position after measuring 65% compression. Lower hysteresis values, or less IFD loss are desirable. Low hysteresis in conventional foam is equal to less IFD loss.

It is to be understood herein that the expression Ball Rebound no. (i.e. BR no.) is a reference to a resilience measure which is the rebound height attained by a steel ball, expressed as a percentage of the original drop height. The measurement test involves dropping a steel ball of known mass from a predetermined height onto a foam sample (of a desired foam material); see for example the test procedure (ASTM D3574) used to measure the surface resilience of flexible polyurethane foam.

It is to be understood herein that the expression Support Factor no. (i.e. SF no.) is a reference to a ratio of IFD values for a foam material, namely a 65% IFD value and a 25% IFD value wherein SF=65% IFD/25% IFD, the ratio being determined after one minute of rest or recovery. Foam materials with low support factor (SF) are more likely to bottom out (lack support) under load. (see also Compression Modulus below)

Thus in accordance with one aspect the present invention provides a coalescing agent or medium for facilitating the separation of a non-aqueous phase from an aqueous phase of an aqueous medium, said agent consisting of particles of a polymeric foam material having:
  an IFD no. of 40 or higher (i.e. at least 40)
  a BR no. of 35 or higher (at least 35)
  a SF no. of 1.8 or higher (i.e. at least 1.8) and
  a density of 42 kg/m$^3$ or less.

In accordance with the present invention there is provided a coalescing agent wherein said polymeric foam material may, for example, be selected from the group of foam materials consisting of polyurethane foam, polystyrene foam, polypropylene foam, polyester foam, and polyethylene foam.

In accordance with the present invention there is provided a coalescing agent wherein said agent may comprise (e.g. consist of) particles of a polymeric foam material having:
  an IFD no. of from 40 to 125
  and
  a density of 30 kg/m$^3$ or less.

In accordance with the present invention there is provided a coalescing agent wherein said agent may comprise (e.g. consist of) particles of a polymeric foam material having an IFD no. of from 90 to 125.

In accordance with the present invention there is provided a coalescing agent wherein said agent may comprise (e.g. consist of) particles of a polymeric foam material having an IFD no. of from 50 to 95.

In accordance with the present invention there is provided a coalescing agent wherein said agent may comprise (e.g. consist of) particles of a polymeric foam material having a BR no. of from 35% to 55.

In accordance with the present invention there is provided a coalescing agent wherein said agent may comprise (e.g. consist of) particles of a polymeric foam material having an SF no. of from 1.8 to 2.5.

In accordance with the present invention there is provided a coalescing agent wherein at least 85% by weight of said particles comprises particles having a particle size in the range of from 1120 to 4000 microns.

In accordance with the present invention the particles of the coalescing agent may, in particular, be particles which have been obtained by shearing (e.g. by ripping or shredding) of a (e.g. slab of) herein described polymeric foam material i.e. by size reduction which is accomplished in a manner which is distinct and different from mere grinding or sanding of a foam material into particles). Thus the particles may be obtained in a shearing manner such as described for example with respect to FIG. 6 in the above mentioned U.S. patent application Ser. No. 10/541,180 (carrying a publication date of Mar. 9, 2006 and a U.S. publication no. 20060049108) the entire contents of which are incorporated herein by reference. The particles may comprise ragged-edge particulate units such as described in the above mentioned U.S. patent application no. 10/541,180; the particulate units may be particulate units which may have a dimension in the nanoscale range (e.g. 10-100 nanometers); the particulate units may be particulate units wherein the ragged edges of said particulate units include filaments extending outwardly therefrom in the nanoscale range (e.g. 10-100 nanometers). The particles may for example be obtained as described herein below.

In accordance with the present invention the polymeric foam material may be any polymer suitable for the purposes herein, e.g. monomeric based polymer, a copolymer, etc.; for example, the polymeric foam material may be selected from the group of foam materials consisting of polyurethane foam, polystyrene foam, polypropylene foam, polyester foam, and polyethylene foam. Other types of foam material may be used keeping in mind the purpose specified herein, e.g. a copolymer of polyethylene and polypropylene, a copolymer of styrene and polyethylene, a copolymer of styrene and polypropylene, etc.

Suitable starting foam material for shearing (i.e. shredding) may be obtained commercially (e.g. from Domfoam International Inc. Montreal Quebec Canada). Thus it is possible to obtain a suitable starting foam slab from a manufacturer who identifies the foam material in relation to the desired or necessary IFD no., BR no., SF no. and density measurements.

The (starting) polymeric foam material (i.e. in the form of a slab of predetermined or desired size) to be rendered into particles for the present invention may as mentioned above, for example, be selected from the group of foam materials consisting of polyurethane foam, polystyrene foam, polypropylene foam, polyester foam, and polyethylene foam. Suitable starting foam materials may, more particularly, be obtained from Domfoam International Inc. (DOMFOAM) Montreal Quebec; such foam materials include polyurethane foam material in slab form obtainable from DOMFOAM under product numbers such as:

| Product no. | IFD no. | BR no. (minimum) | SR no. (minimum) | Density (kg/m) |
| --- | --- | --- | --- | --- |
| 2565 | 55-65 | 40 | 2.1 | 40.0462 |
| 2545 | 42-48 | 45 | 2.1 | 40.0462 |
| 1095 | 98-125 | 35 | 2.1 | 16.0165 |

In accordance with another aspect the present invention provides a liquid permeable coalescing body for facilitating the separation of a non-aqueous phase from an aqueous phase of an aqueous medium, said body comprising a coalescing agent or medium as defined herein, said coalescing agent being subjected to a compression force of from 150 to 600 psi (e.g. within the confines of a cartridge such as for example described herein).

In accordance with a further aspect the present invention provides a liquid permeable assembly, for facilitating the separation of a non-aqueous phase from an aqueous phase of an aqueous medium, comprising an enclosure and a liquid permeable body of polymeric foam material packed in said enclosure, said liquid permeable body being a liquid permeable coalescing body as defined in herein, said enclosure having a fixed (i.e. first) upstream foraminous sidewall and an opposed fixed (i.e. second) downstream foraminous sidewall, said enclosure and said liquid permeable body being configured such that a flow of aqueous emulsion is able to pass through said fixed, upstream foraminous sidewalk, through said liquid permeable body and out of said enclosure through said opposed, fixed, downstream foraminous sidewall.

The terms "leak" and "leaking" as used herein are to be understood as characterizing a fluid as being able to go through a channel, or an open space, that is large enough that oil droplets passing therethrough avoid contact of oil droplets with the media.

The term "absorption" for the purpose of this application refers to any process that causes one substance to penetrate the inside of another substance. In the case of a spill clean-up, the aqueous phase and the non-aqueous phase are absorbed into porous sorbent materials or into particulate material spaces.

The term "adsorption" for the purpose of this application refers to a process that causes one substance to be attracted to and stick to the surface of another 30 substance, without actually penetrating its surface.

It is thus also to be understood herein that the expressions "coalescent bed", "coalescent body" or the like refer to a coalescent bed, body or the like which is able to facilitate the coalescence, for example, of water immiscible liquid droplets (e.g. oil droplets) from an emulsion comprising the water immiscible liquid (e.g. oil) in water (i.e. water being the continuous phase). Such a "coalescent bed","coalescent body" or the like may for example comprise a coalescing agent as described herein.

In the drawings which illustrate an example(s) embodiment(s) of the invention:

FIG. 1) is a perspective view from above of an example embodiment of a cartridge assembly in accordance with the present invention;

FIG. 2) is a perspective exploded view of the top end of the cartridge of FIG. 1 including a gasket member;

FIG. 3) is a perspective view from below of the (second) cap element shown in FIG. 2;

FIG. 4) is a perspective exploded view of the lower end of the cartridge assembly of FIG. 1 including a gasket member;

FIG. 5) is a perspective view from below of the (first) cap element shown in FIG. 4;

FIG. 6) is a cross-sectional side view of the cartridge assembly of FIG. 1, including gasket members, and wherein the outer cylindrical housing component, the first and second cap elements, the inner tubular component and the gasket members are shown in cross-section;

FIG. 7) is an exploded perspective view from above of the cartridge assembly of FIG. 1 associated with elements of an example clamp type cartridge attachment mechanism for connection of the cartridge assembly in a (coalescence type) liquid separator system;

FIG. 8) is a perspective view from above of a cartridge tower comprising three cartridges of FIG. 1 nested together with the elements of the example clamp type cartridge attachment mechanism of FIG. 7, the cartridge assemblies being charged with particulate coalescent material as described herein;

FIG. 9) is a cross sectional side view of the cartridge tower of FIG. 8;

FIG. 10) is an enlarged view of the cartridge tower of FIG. 9;

FIG. 11) illustrates in schematic fashion the association of a (charged) cartridge as described in a separator system for the separation of an (immiscible) oil from water;

FIG. 12) illustrates in schematic format an example (first) size reduction structure for the preparation of intermediate size particles in accordance with the present invention;

FIG. 13) illustrates in schematic format an example (second) size reduction structure for the preparation of particles in accordance with the present invention using as feed, intermediate particles from the size reduction structure shown in FIG. 12;

Figure 14:
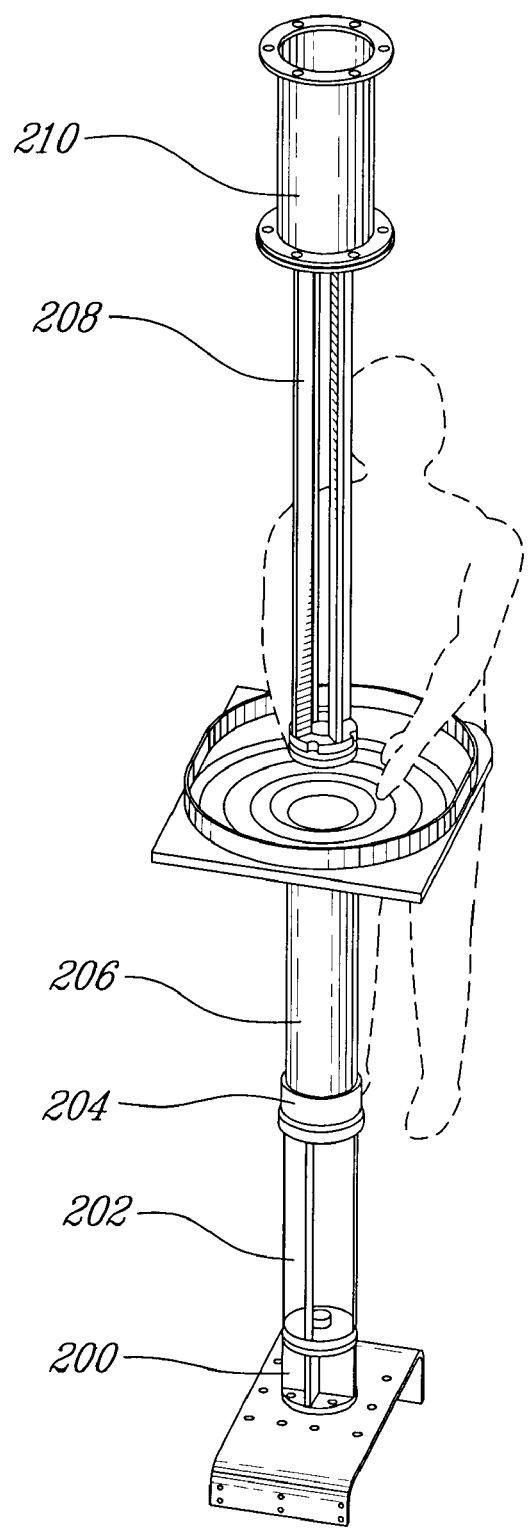
Figure 15:
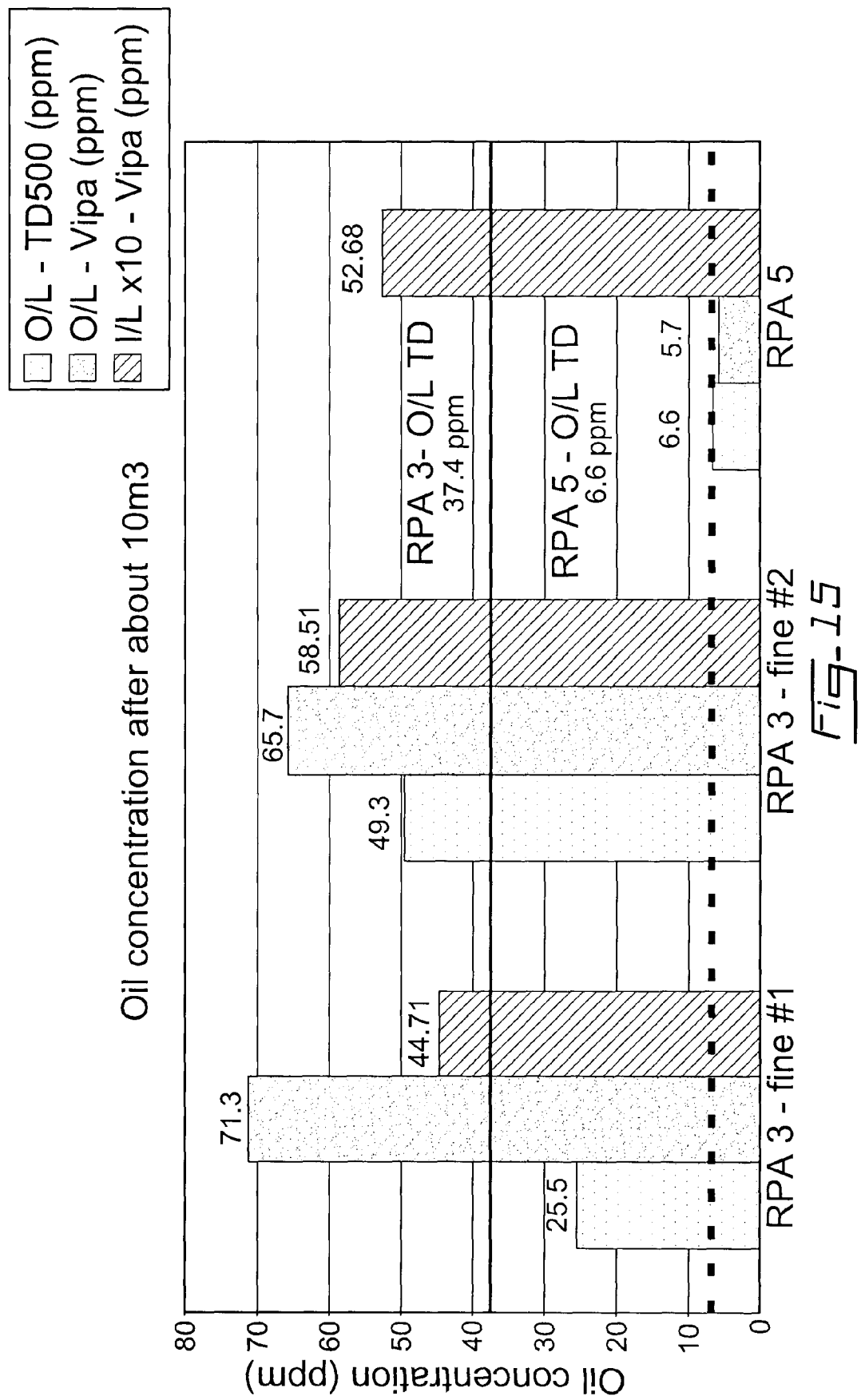
Figure 16:
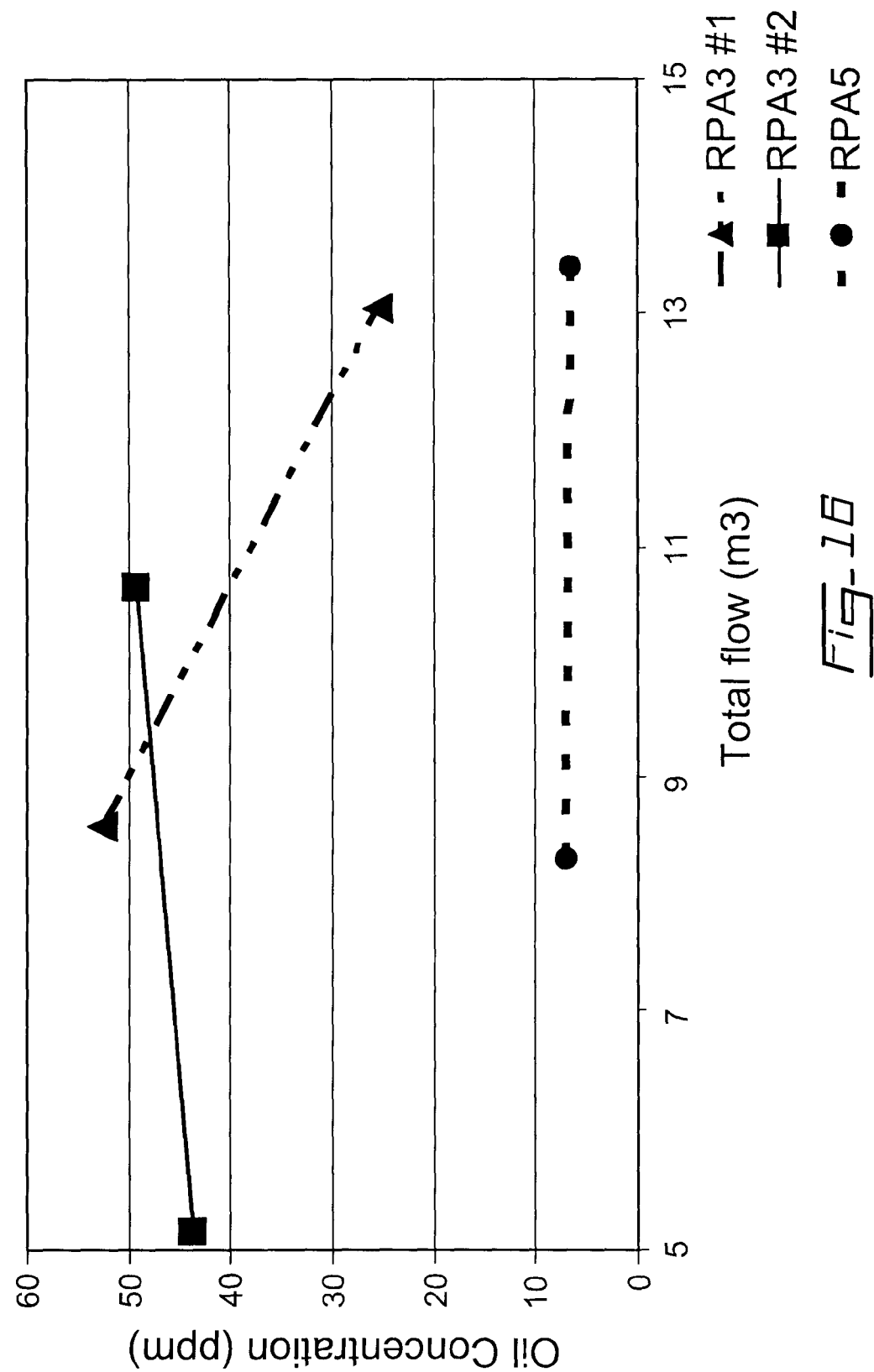
Figure 17:
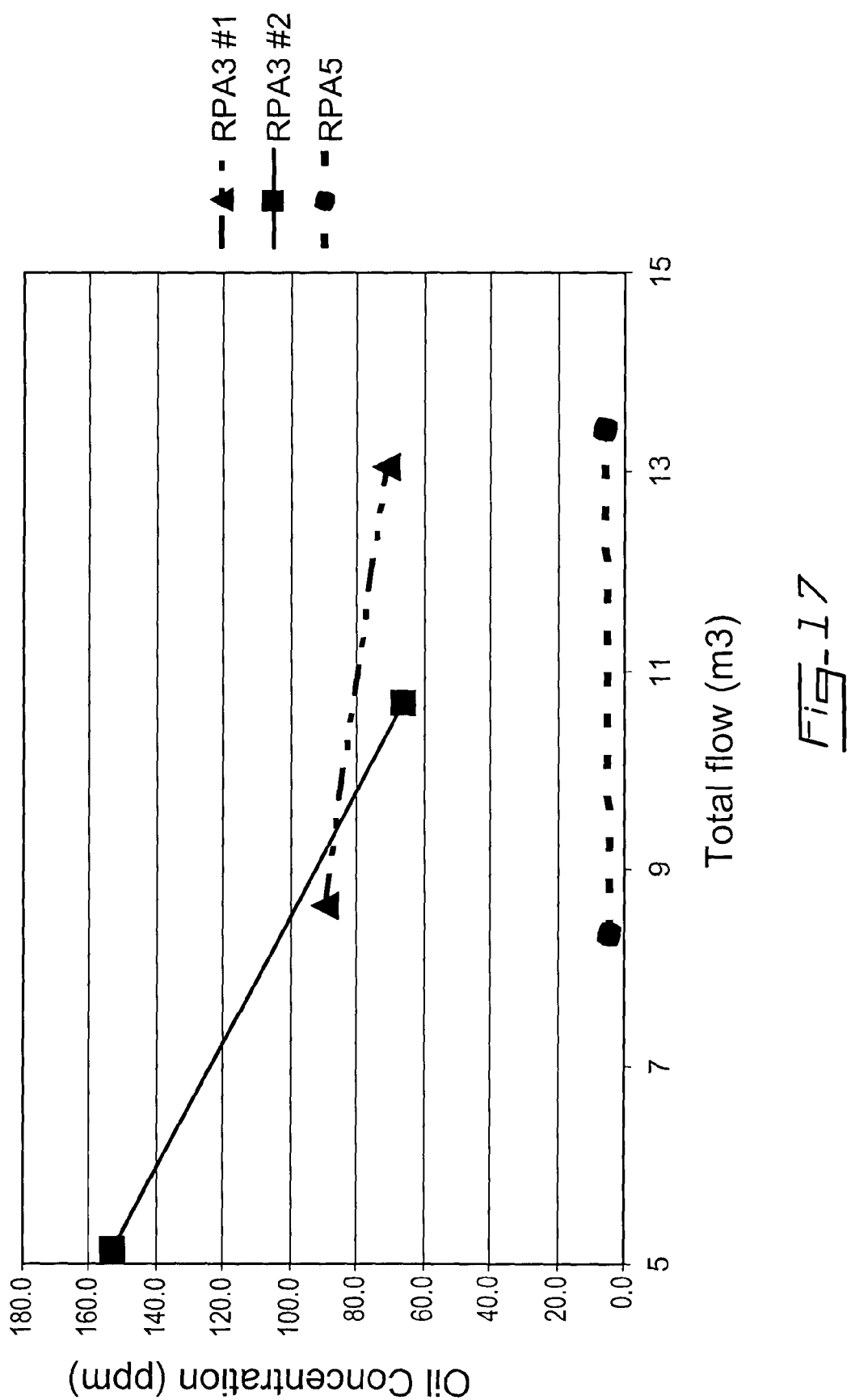

FIG. 14 (i.e. FIG. 14) illustrates in schematic format an example charging mechanism for charging a cartridge as described herein with coalescing agent also as described herein; and FIGS. 15, 16 and 17 (i.e. FIG. 15, FIG. 16 and FIG. 17) respectively illustrate a Graphic 1, a Graphic 2 and a Graphic 3; these Graphics are graphs showing relative efficiencies of RPA3 and RPA5 coalescing cartridges.

In each of the figures the same reference numerals are used to identify the same elements, components, members, etc.

Referring to FIGS. 1 to 6 the coalescing material may, for example be charged into the annular chamber of an example cartridge assembly as set forth in these figures.

Figure 1:
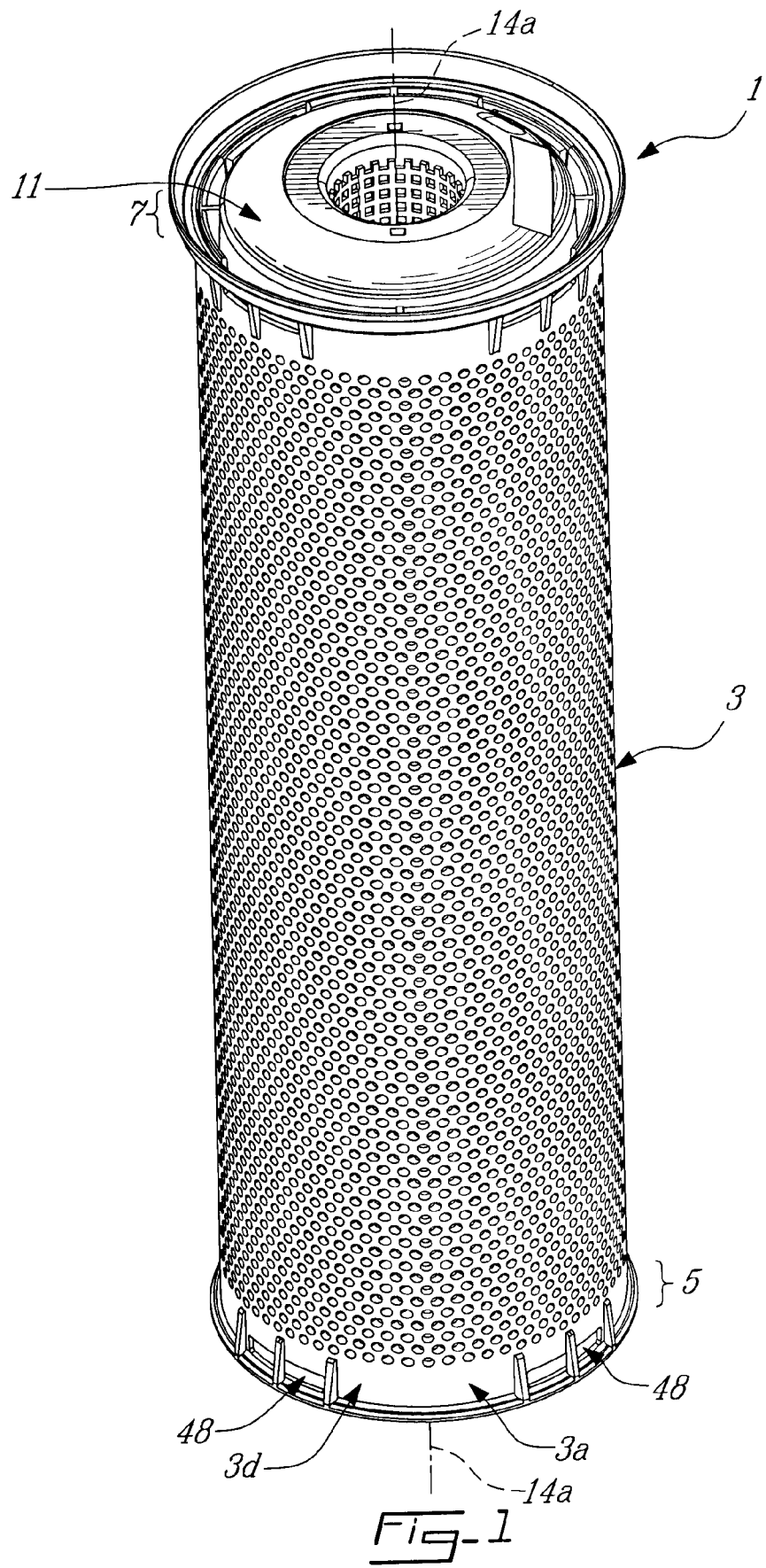
FIG. 1 (i.e.

Referring to FIG. 1 the illustrated example cartridge assembly comprises an outer cylindrical housing component 1 (e.g. enclosure, casing, etc.). The outer housing component 1 comprises a cylindrical enclosure wall element 3 which is further provided with a plurality of wall perforations along its entire length and circumference.

The cylindrical enclosure wall element terminates in opposed ends which are respectively generally indicated by the reference numerals 5 and 7.

Figure 2:
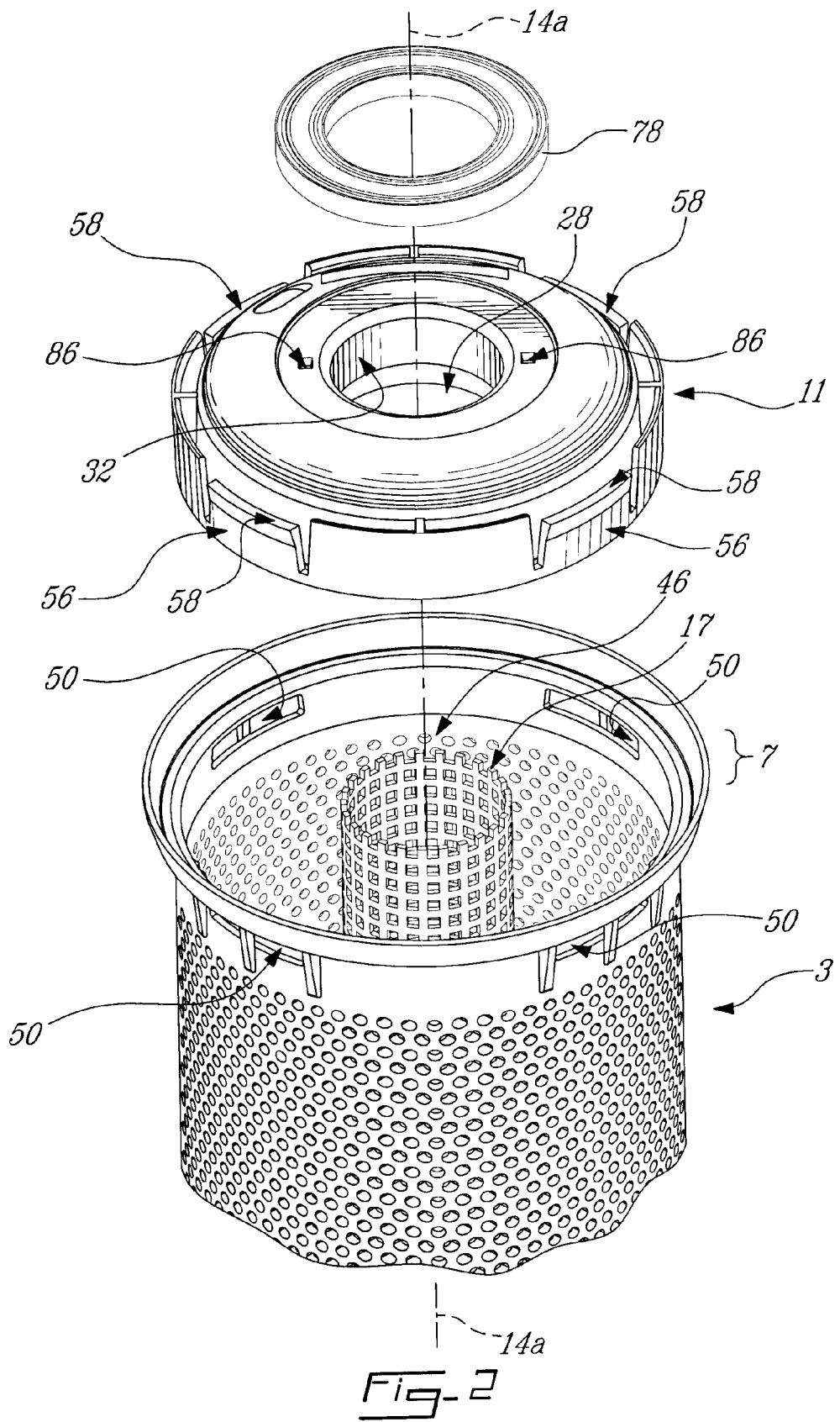
FIG. 2 (i.e.
Figure 3:
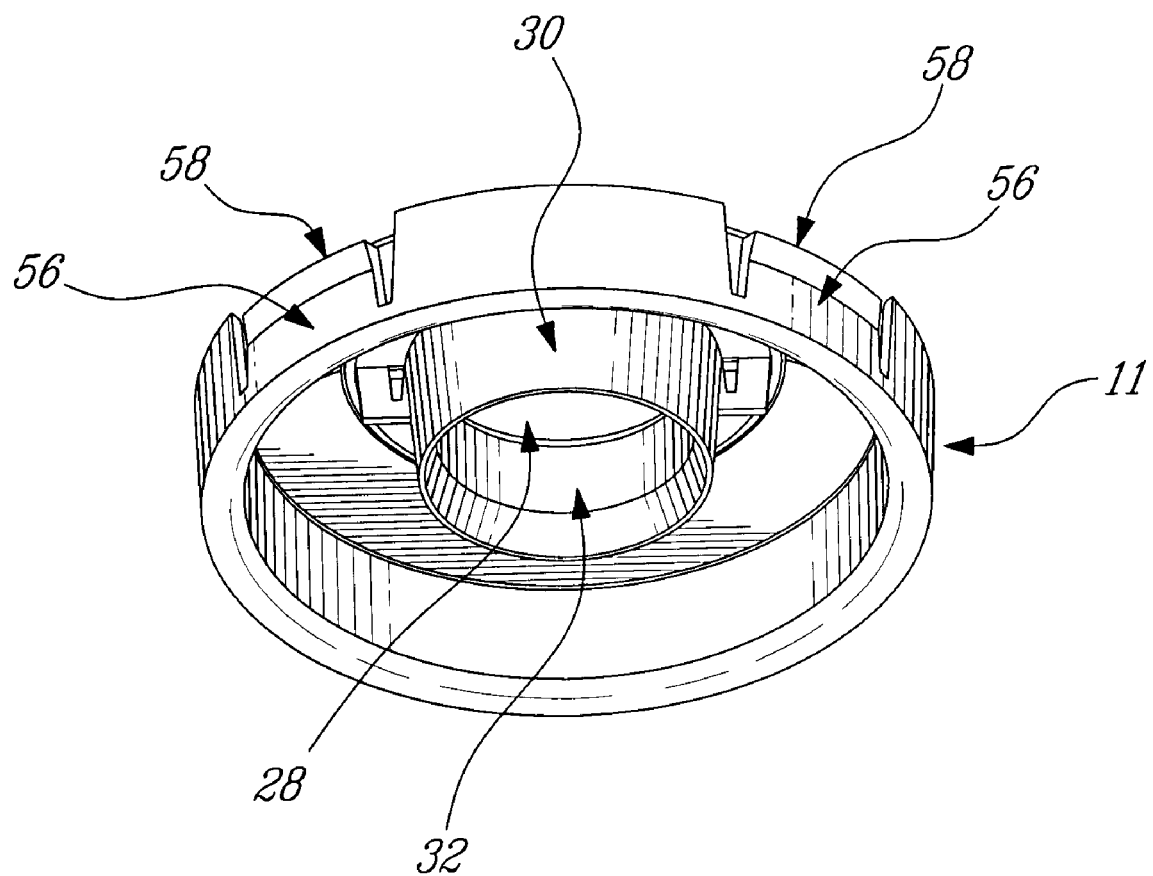
FIG. 3 (i.e.
Figure 4:
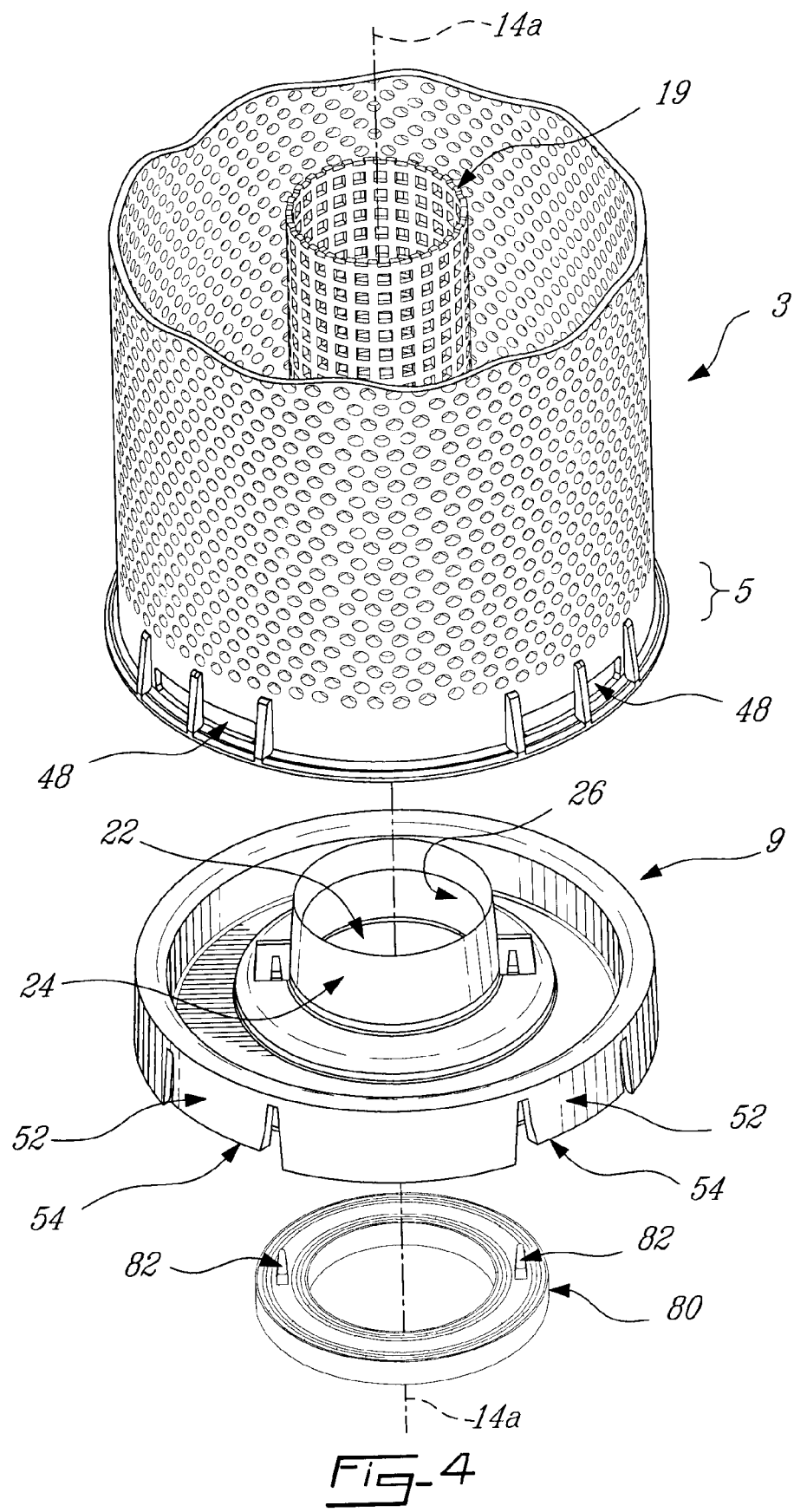
FIG. 4 (i.e.

Referring in particular to FIGS. 2 and 4, the outer cylindrical housing component 1 also comprises a first end cap element 9 and a second end cap element 11. As may be appreciated from FIGS. 1 and 6, the opposed end 5 of the cylindrical enclosure wall element 3 is closed off by the first cap element 9 and the other opposed end 7 of the cylindrical enclosure wall element 3 is closed off by the second cap element 11.

Figure 6:
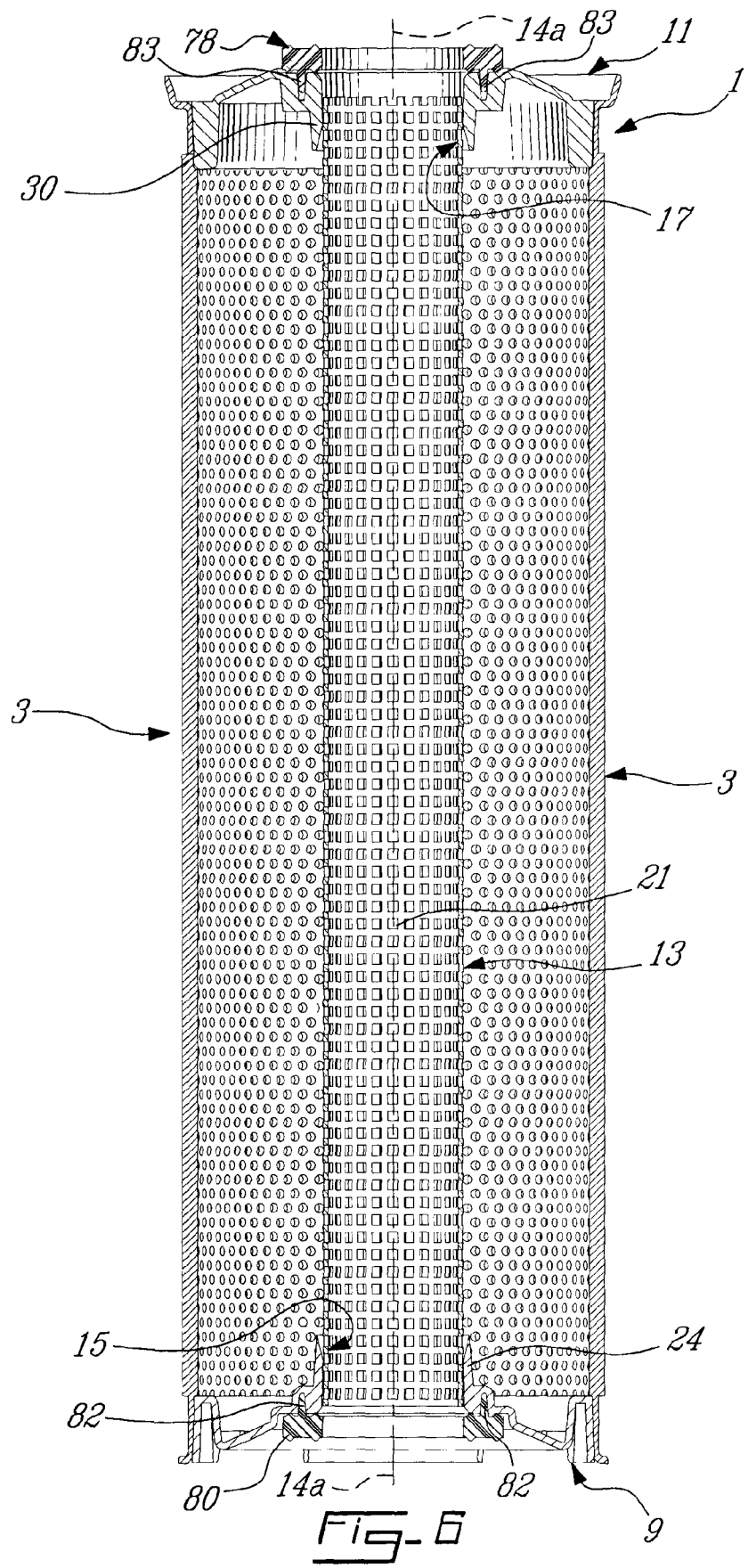
FIG. 6 (i.e.
Figure 7:
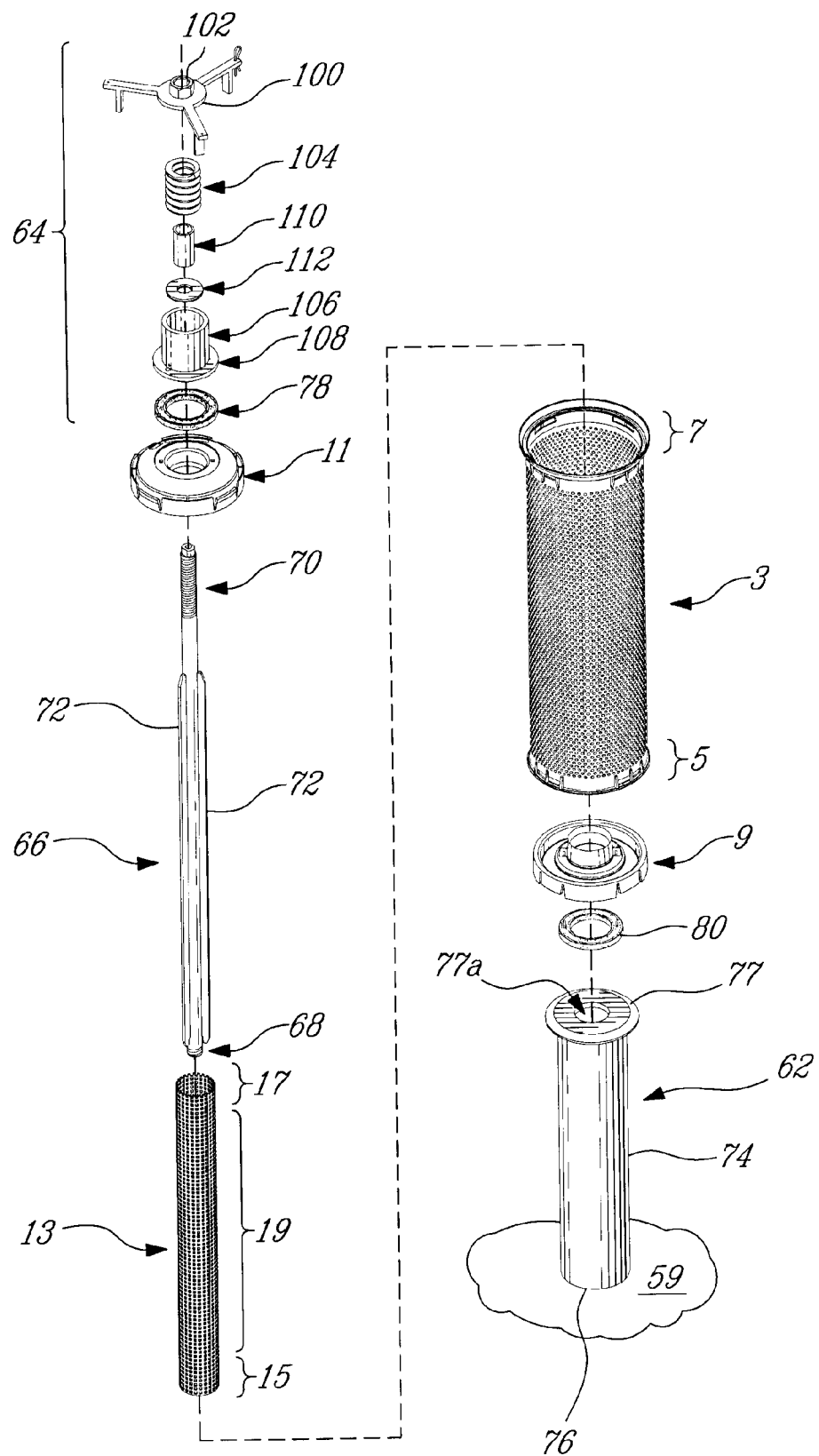
FIG. 7 (i.e.
Figure 8:
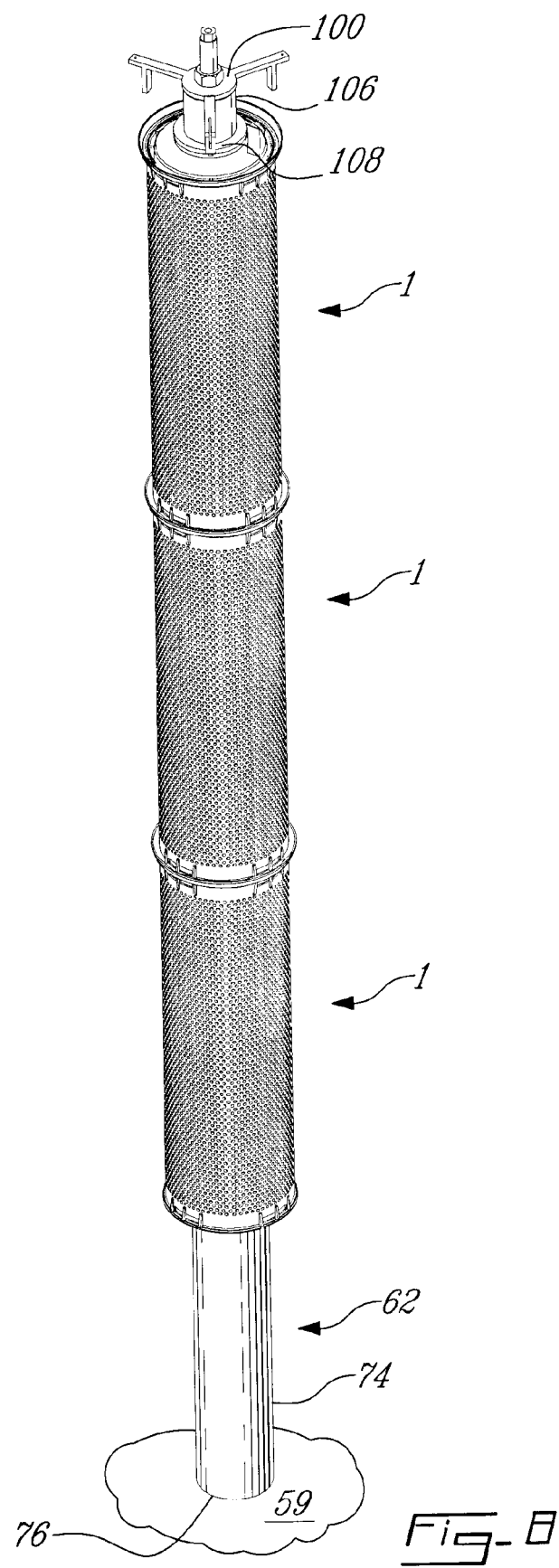
FIG. 8 (i.e.

The illustrated example cartridge assembly also comprises an inner tubular component 13 (see in particular FIG. 7) disposed within the cylindrical housing component 1 (see also FIGS. 2, 4 and 6). The outer cylindrical housing component 1 has a first cylindrical axis (reference numeral 14 in FIG. 2) which is coterminous or coincident with the tubular axis of the inner tubular component 13. In other words the outer cylindrical housing component 1 and the inner tubular component 13 share a common (longitudinal) axis; this common axis is designated by the reference numeral 14a in FIGS. 1, 2, 4 and 6.

The inner tubular component 13 (see FIG. 7) has a first end member 15, a second end member 17 and an intermediate tubular wall member 19 extending from the first end member 15 to the second end member 17. The inner tubular component 13 defines an interior channel, i.e. an interior channel which extends from the first end member 15 through the tubular wall member 19 to the second end member 17. The inner tubular component 13 is further provided with a plurality of wall perforations along its entire length and circumference (see FIGS. 2, 4 and 6) such that when it is installed in place within the cylindrical housing component 1 the tubular wall member 3 thereof is liquid permeable for allowing the passage of liquid medium therethrough. One such perforation is designated 21 in FIG. 6.

Figure 5:
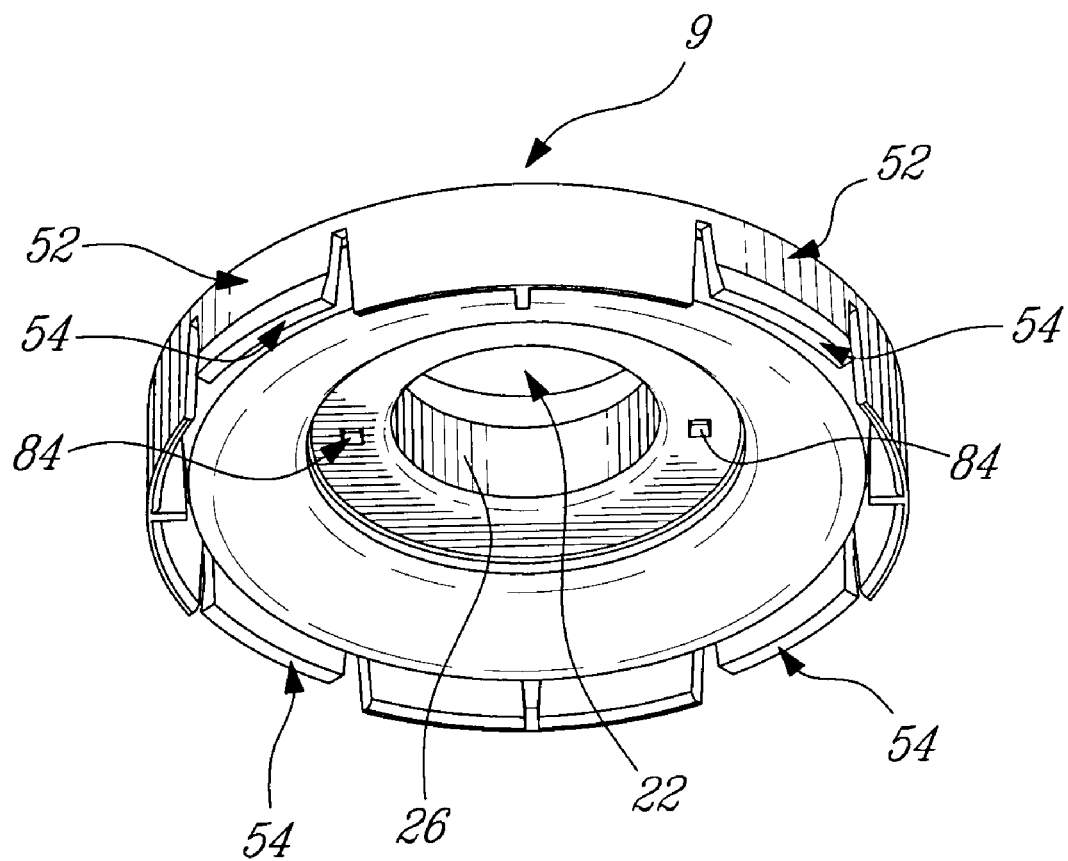
FIG. 5 (i.e.

Referring to FIGS. 4, 5 and 6 the first end cap element 9 includes a first opening 22 extending therethrough. The first end cap element 9 thus includes a wall member 24 which defines the opening 22. The wall member 24 has an interior surface 26 configured and sized to engage the first end member 15 of the inner tubular component 13. In this way, as may be seen, the first end member 15 of the inner tubular component 13 may be connected to the first end cap element 9 such that the first opening 22 thereof is in liquid communication with the interior channel of the inner tubular component 13 (i.e. with the interior of the tubular wall member 19).

Additionally, for the embodiment shown (see FIGS. 2, 3 and 6), the second end cap element 11 also has a second opening 28 extending therethrough. The second end cap element 11 also includes a wall member 30 which defines the opening 28. The wall member 30 has an interior surface 32 configured and sized to engage the second end member 17 of the inner tubular component 13. In this way, the second end member 17 of the inner tubular component 13 is similarly connected to the second cap element 11 such that the interior channel of the inner tubular component 13 is in liquid communication with the second opening 28; i.e. the interior of the tubular wall member 19 is in liquid communication with the second opening 28.

As may be appreciated from FIG. 6, the inner tubular component 13 is shown as extending from the lower first end cap element 9 to the other upper second end cap element 11 in the figures so as to provide liquid communication from one end cap element opening (22) to the other end cap element opening (28).

As may be appreciated from FIGS. 2, 4, 6 and 7, the outer cylindrical housing component 1 and the inner tubular component 13 define an annular solid (e.g. particulate) matter holding chamber. For the purposes of illustration herein, the solid (e.g. particulate) matter is not indicated in any of the figures except for FIGS. 9 and 10. However, in practice, one of the end cap elements 9 or 11 would be installed to the assembled cylindrical enclosure wall element 3 (as by screw engagement, snap lock engagement etc.) so as to close off a respective opposed end 5 or 7 thereof. The inner tubular component 13 would then be inserted into the opening 22 (or 28) of the installed end cap element such that the wall member 24 (or 30) engages a respective end member 15 or 17 of the inner tubular component 13 as seen for example on FIG. 6. Thereafter the annular holding chamber would be (completely) filled (via the remaining unobstructed other opposed end) with the desired (amount and type of) solid material (i.e. a coalescing agent in accordance with the present invention, e.g. a particulate coalescence inducing material of the present invention) so as to form as desired a coalescing bed. Once the annular holding chamber would be filled as desired, the remaining cap element 9 or 11 would be installed or engaged (as by screw engagement, snap lock engagement etc) with respect to the remaining opposed end of the cylindrical enclosure wall element 3 as well as with respect to the other end member of the inner tubular component 13.

In accordance with the present invention the annular holding chamber may be filled (in any desired or necessary manner) with the desired coalescing agent of the present invention such that the coalescing agent may be maintained therein (i.e. as a coalescent bed) keeping in mind the purpose of the coalescing agent to separate a non-aqueous phase from an aqueous phase of an aqueous medium e.g. the coalescing agent may be subjected to a predetermined compression force, e.g. a compression force of from 150 to 600 psi. In other words, the amount of coalescing agent to be added to the holding chamber may be chosen as a function of the holding chamber size and configuration such that when the remaining end cap is installed, the coalescing agent (i.e. under compression) may be able to fulfill its desired function e.g. to facilitate separation of oil from water. The coalescing bed formed from the coalescing agent may, for example, be subject to the above mentioned compression force of from 150 to 600 psi; depending on the material used to form the coalescing agent the coalescing agent may of course be subject to a compression force which is outside the range of 150 to 600 psi (keeping in mind the purpose thereof).

It is of course to be appreciated that once the first end cap element 9 is attached to the end 5 of the cylindrical enclosure wall element 3, the inner tubular component 13 may be inserted into the cylindrical enclosure wall element 3 so that the first end member 15 thereof is slide into (releasable) engagement (i.e. in surface to surface abutment) with the above mentioned opening 22 of the first end cap element 9, i.e. the first end member 15 may engage the opening 22 in a (releasable) snug but not tight press fit type engagement for facilitating manual disengagement. Again, as mentioned above, the so formed annular holding space may then be filled with the desired particulate material. Once the annular holding space is filed with the coalescing agent, i.e. particulate material (not shown in FIGS. 1 to 6) the second end cap 11 is attached as described above; however, the attachment of the second end cap element 11 includes the alignment and sliding engagement (i.e. in surface to surface abutment) of the second end member 17 of the inner tubular component 13 with the opening 28 of the second end cap element 11; again, the second end member 17 may engage the opening 28 in a (releasable) snug but not tight press fit type engagement for facilitating manual disengagement.

Referring to FIGS. 7 to 10 a cartridge assembly of FIGS. 1 to 6, charged with suitable particulate material, may be incorporated into a coalescent type separator system. The system may comprise a liquid inlet chamber (not shown) and a liquid separator chamber (not shown) which share a common wall 59. The liquid inlet chamber has a liquid inlet (not shown) for input of liquid medium; the liquid separator chamber has a first lower liquid outlet (not shown) for discharge of a liquid (e.g. water) and a second upper liquid outlet (not shown) for discharge of a liquid (e.g. lighter water immiscible oil). The common wall 59 between the liquid inlet chamber and the liquid separator chamber has an opening (i.e. common wall opening 60) for liquid communication between the inlet chamber and the separator chamber (see FIG. 9).

The separator system (see FIG. 7) may comprise a clamp type cartridge attachment means or mechanism, as shown, which includes a cartridge support anchor component and a cartridge attachment component respective generally, indicated by the reference numerals 62 and 64. The clamp type cartridge attachment mechanism also includes an interconnection shaft member 66 whereby one or more cartridge assemblies (see FIGS. 7, 9 and 10) may be maintained in place under compression between the cartridge support anchor component 62 and the cartridge attachment component 64.

The interconnection shaft member 66 has two externally threaded opposed ends 68 and 70. The interconnection shaft member 66 also has three equally spaced baffle or wing members 72 which extend radially outwardly from the shaft body of the interconnection shaft member 66. The baffle members 72 also extend longitudinally parallel to the longitudinal axis of the interconnection shaft member 66.

The cartridge support anchor component 62 is hollow and has an outer peripheral wall 74.

An opening end of the outer peripheral wall 74 of the cartridge support anchor component 62 is connected or attached to the common wall 59 about the common wall opening 60 in liquid (i.e. water) tight fashion so as to inhibit leaks thereabout (e.g. by a suitable weld 76 in the case where both the common wall and the peripheral wall are of metal). Liquid medium in the inlet chamber thus has access to the interior of the cartridge support anchor component 62, defined by the outer peripheral wall 74, through the common wall opening 60.

The other end of the cartridge support anchor component is provided with an annular gasket engagement platform 77; this platform has a central opening 77a. The annular gasket engagement platform 77 is disposed so as to engage an annular gasket (e.g. rubber gasket) attached to a cartridge assembly of the present invention.

Referring to FIGS. 2, 4 and 6 these figures show two annular gaskets, namely upper and lower gaskets 78 and 80 (i.e. rubber gaskets) associated with respect to end cap element 9 or 11 of the cartridge assembly of FIGS. 1 to 6. The upper and lower gaskets 78 and 80 each have a pair of respective connection projections 82 or 83 which press fit engage with respective gasket engagement openings 84 or 86 of a respective end cap element 9 or 11. On the other hand, if two or more cartridge assemblies are to be stacked one upon the other only the bottom cartridge assembly need be provided with two such attached annular gaskets 78 and 80. As may be seen in FIG. 10 the upper cartridges need only be provided with the upper gasket 78 since the upper gasket 78 of an immediately adjacent lower cartridge assembly will serve the function of a lower gasket for the upper cartridge assembly.

Turning back to FIGS. 7 to 10, and in particular FIG. 10, a liquid permeable shaft connection member 90 is disposed in the interior of the cartridge support anchor component 62. One end of the shaft connection member 90 is attached to the interior side of the engagement platform 77 about the central opening 77a in liquid (i.e. water) tight fashion (e.g. by weld 92 where the platform 77 is of metal) so as to inhibit leaks. The other end of the shaft connection member 90 is provided with a socket member 94 having interior screw threads for screw engagement with the threaded end 68 of the interconnection shaft member 66 i.e. the interconnection shaft member 66 is (screw) attached to the cartridge support anchor component 62 by this socket member 94. The shaft connection member 90 is also provided between the two ends thereof with openings 98 such that liquid medium may pass into the interior of the shaft connection member 90 and out through the central opening 77a. The cartridge attachment component has a rotatable compression adjustment member 100 which has an opening 102 for receiving the other end 70 of the interconnection shaft member 66. The opening 102 of the rotatable compression adjustment member is provided with interior screw threads for screw engagement with the screw threads of the end 70 of the interconnection shaft member 66.

The cartridge attachment component includes a compression spring 104 disposed about the interconnection shaft member 66 between the rotatable compression adjustment member 100 and a compression engagement member 106.

The compression engagement member 106 has an opening through which the interconnection shaft member 66 may pass for engagement with the compression adjustment member 100. The compression engagement member 106 has an annular shoulder member 108 for (compression) engagement with the upper annular gasket 78 attached to the immediately adjacent cartridge assembly.

The cartridge attachment component also has a sleeve member 110 and a washer member 112 which are rotatable about the longitudinal axis of the interconnection shaft member 66.

Figure 10:
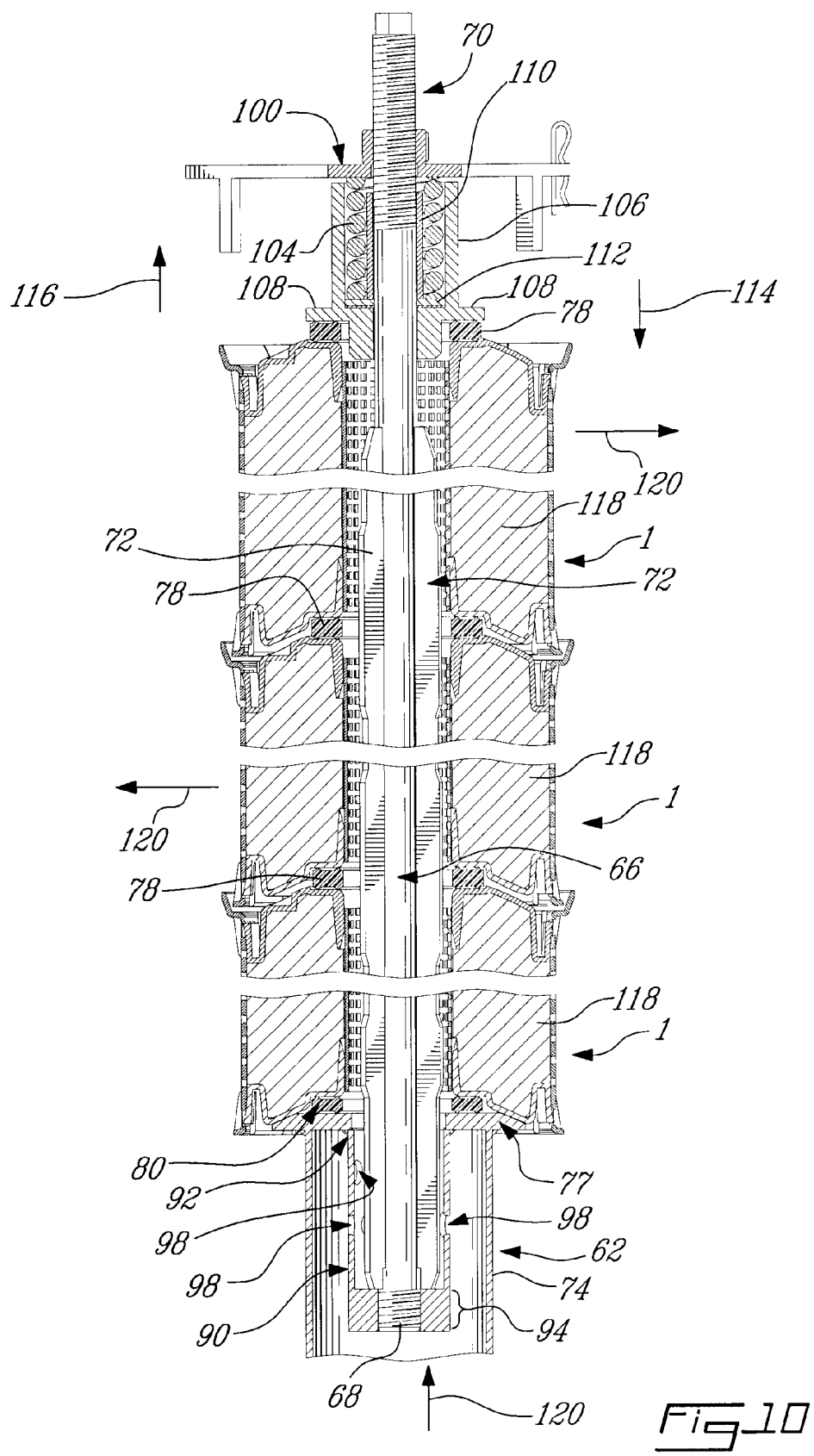
FIG. 10 (i.e.

As may be appreciated the direction of rotation of the compression adjustment member 100 will determine the degree of compression to which the cartridge assembly(ies) are subjected; during operation sufficient compression is to be applied so as to provide liquid (i.e. water) tight interconnection between adjacent cartridge assemblies and between the cartridge assembly(ies) and the adjacent cartridge support anchor component and the adjacent cartridge attachment component. Referring to FIG. 10 rotation of the compression adjustment member which induces displacement of the compression adjustment member in the direction of the arrow 114 will favor compression whereas an opposite rotation which induces displacement of the compression adjustment member in the direction of the arrow 116 will release compression and at the limit allow removal of the compression adjustment member altogether from the interconnection shaft member 66 such that the stacked cartridge assemblies may be removed for replacement. If desired the removed, used cartridge assemblies may be broken down in order to replace the particulate charge. Thus by removing one or both of the releasable end cap elements, and if necessary or desired detaching the wall panels one from other, the used particulate charge may be recovered; thereafter the components of the cartridge assembly as necessary or desired may be cleaned and the cartridge assembly refilled (for example in the manner as mentioned above) with new particulate material.

Figure 9:
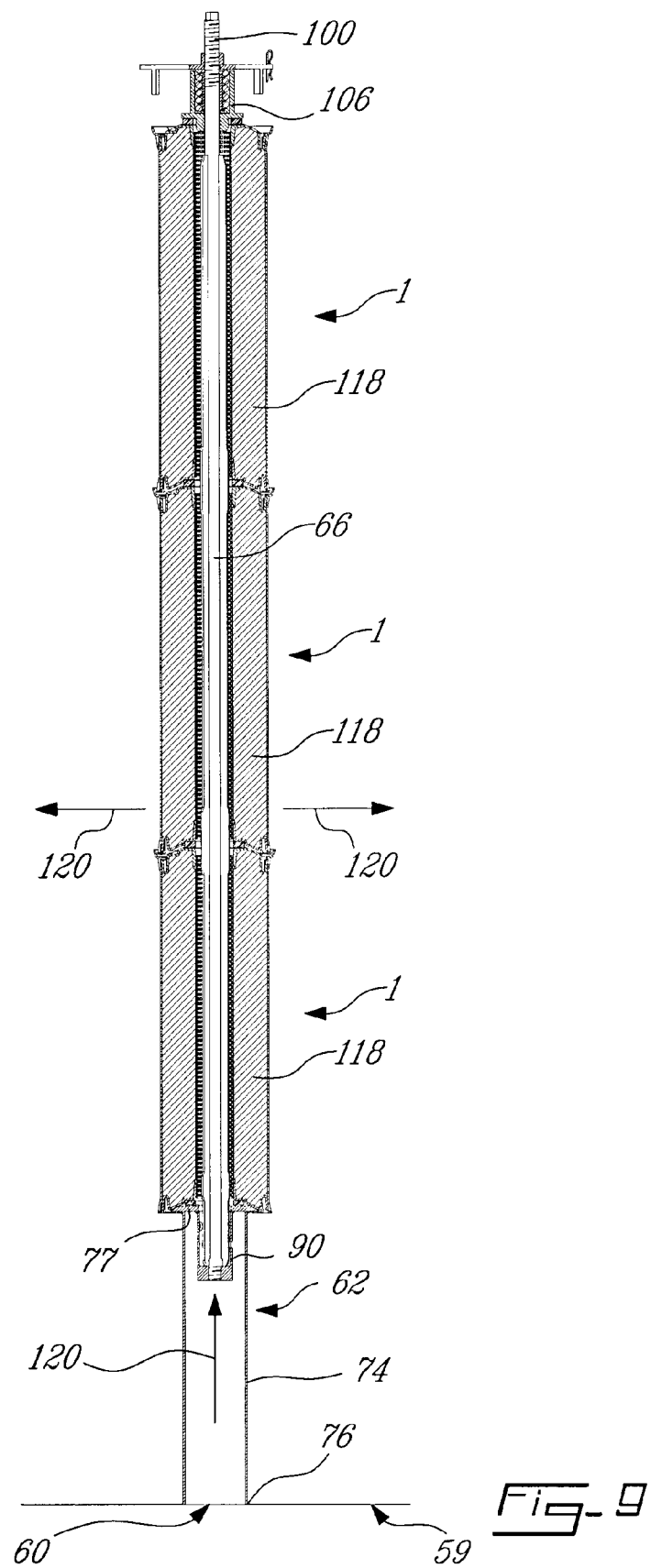
FIG. 9 (i.e.

As may be seen in FIGS. 9 and 10 the cartridge assemblies 1 are shown charged with solid (e.g. particulate) material 118 (i.e. coalescing agent).

Liquid (medium) may pass through the cartridge tower of FIGS. 9 and 10 as shown by the flow arrows 120.

Figure 11:
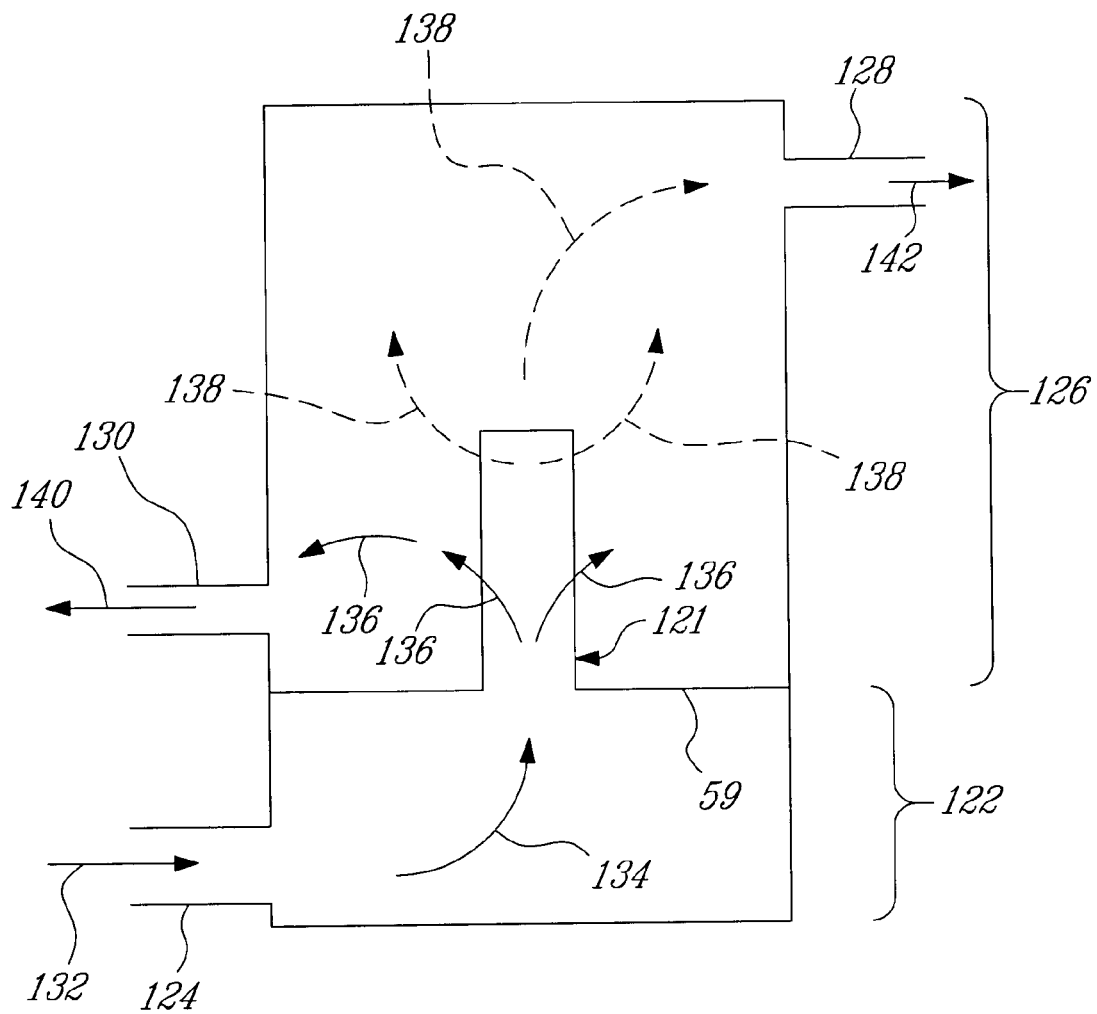
FIG. 11 (i.e.

FIG. 11 illustrates in schematic fashion the association of a cartridge assembly of the present invention as part of a cartridge tower 121 in a separator system for the separation of an (immiscible) oil from water. The cartridge tower 121 may comprise for example, a cartridge tower such as shown in FIGS. 9 to 10, i.e. be a cartridge tower with three (coalescing agent) charged cartridge assemblies in accordance with of the present invention. A cartridge tower could, of course, as desired or necessary comprise a different number of charged cartridge assemblies, i.e. one or more charged cartridge assemblies. Furthermore, although FIG. 1 shows a single cartridge tower 121, a separator system may comprise a plurality of cartridge towers, i.e. one or more cartridge towers (see FIGS. 9 and 10 for example). Although not shown the cartridge tower may, as desired or necessary, be associated with a tower stabilization/alignment means, e.g. a support ring connected to the separator housing which has an opening which is sized to just be able to encircle but not to touch the outer diameter surface of the last upper cartridge assembly; the support opening sized would allow a cartridge assembly to pass axially therethrough.

The system shown in FIG. 11 has a lower liquid input chamber 122 with a liquid inlet 124 and an upper separation chamber 126 with an upper liquid outlet 128 and a lower liquid outlet 130. For the single cartridge tower shown the lower liquid input chamber 122 and the liquid inlet 124 could of course be combined as a single inlet pipe arrangement. The lower liquid chamber is shown as a possible arrangement for including a plurality of cartridge towers each being suitably connected to the common wall 59; alternatively each cartridge support anchor component 62 may be connected to an independent inlet pipe instead of to the common wall 59 or even to a separate distinct liquid input chamber with its own common wall. The liquid combination water/oil enters the lower input chamber as shown by arrow 132. The liquid combination then proceeds upwardly through the cartridge support as shown by the arrow 134. Once passing into the cartridge tower comprising one or more cartridge assemblies of the present invention the separated water passes out of the cartridge tower as shown by arrows 136 and the oil passes out of the tower as shown by dotted arrows 138. The water then passes out of the separator as shown by arrow 140 and the lighter (immiscible) oil passes out of the separator by the arrow 142.

Figure 12:
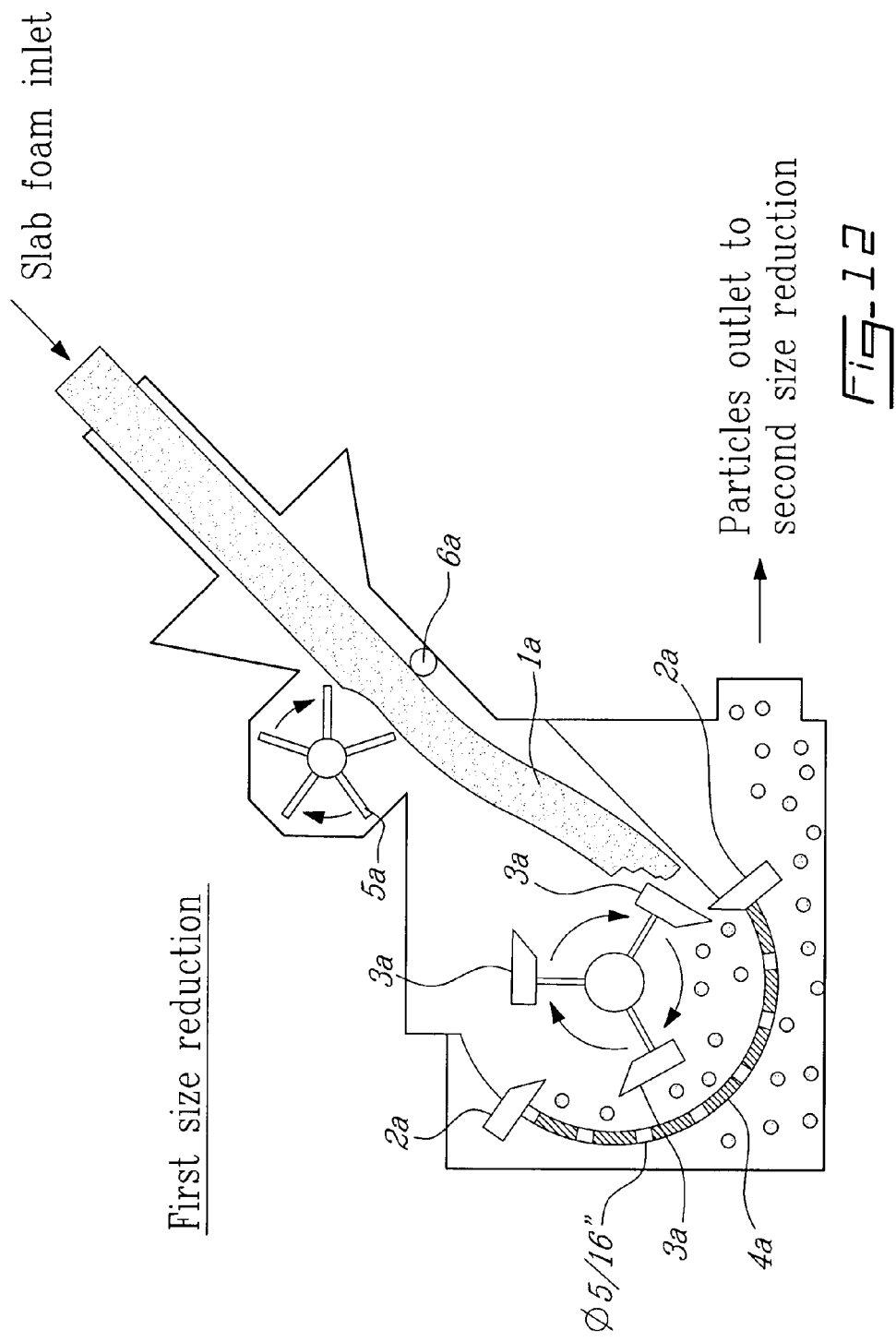
FIG. 12 (i.e.
Figure 13:
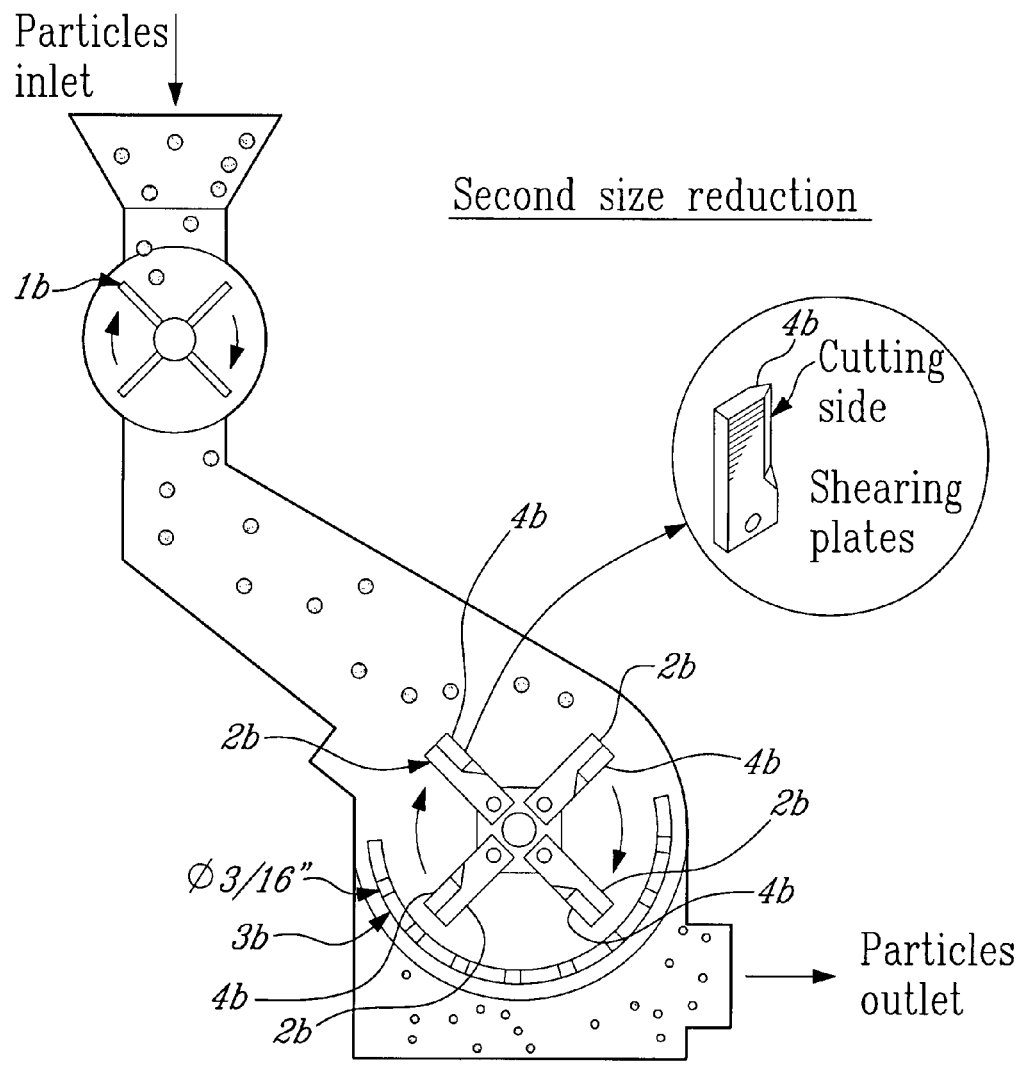
FIG. 13 (i.e.

The following examples describe example embodiments of the present invention. The particles may be obtained by exploiting size reduction structures shown by way of example in FIGS. 12 and 13. For these figures the reference numbers shown refer to the various elements as follows:

FIG. 12: 1a=foam slab
2a=stationary blades
3a=rotatable blades
4a=internal output screen (having holes of 5/16 inch openings)
5a=slab feeder
6a=guiding rod.
FIG. 13 1b=particle feeder
2b=rotatable blades
3b=internal output screen (having holes of 3/16 inch openings)
4b=example shearing plate(s) for rotatable blades 2b.

The granulator units of FIGS. 12 and 13 will be described generally in the following.

As may be appreciated from FIG. 12, a foam slab 1a may be fed into the size reduction unit in the direction of the arrow thereon. The unit has a slab feeder 5a which comprises a plurality of wing elements which extend outwardly in radial fashion from a rotatable shaft member. The rotatable shaft has a longitudinal length. The wing elements also extend (axially) in the longitudinal direction of the rotatable shaft. The unit further has a guide rod 6a which extends parallel to the rotatable shaft. The displacement of the slab 1 is induced by cooperation between the slab feeder 5a and the guide rod 6a. As seen the slab 1 is pinched between the elements 5a and 6a and rotation of the rotatable shaft of the slab feeder 5a (by means not shown) in the direction of the arrows urges the slab 1 unit towards the initial stationary blade 2a and the rotating blades 3a. The rotatable blades 3a are likewise suitably disposed about a further rotatable shaft so as to have a longitudinal length parallel to the longitudinal length of this further rotatable shaft. As may be appreciated the rotatable blades are suitably configured and oriented such that rotation of this further rotatable shaft (also by further means not shown) in the direction of the arrows initially urges or forces the slab 1 into the gap or space between the rotating blades 3a and the initial or leading stationary blade 2a. Once in this gap, cooperation between the rotating blades 3a and the initial stationary blade 2a shears the foam slab as the slab is forced thereinto. Once beyond this gap the sheared particles are then subjected to further size reduction by being forced between the trailing or following stationary blade 2a. the particles are subjected to such continuing size reduction until they reach a size small enough to pass through the openings of the screen 4a and pass out the unit outlet.

Turning to FIG. 13 the intermediate sized particles form the unit shown in FIG. 12 are fed into the illustrated second size reduction unit in the direction of the arrow thereon. The unit has a particle feeder 1b which comprises a plurality of wing elements which extend outwardly in radial fashion from a rotatable shaft member. The rotatable shaft has a longitudinal length. The wing elements also extend (axially) in the longitudinal direction of the rotatable shaft. The downward displacement of particles towards the rotatable blades 2b is also facilitated by gravity. The shearing plates 4b of the blades 2b are likewise suitably disposed about a further rotatable shaft so as to have a longitudinal length parallel to the longitudinal length of this further rotatable shaft. The shearing plates 4b are disposed so that the cutting sides define the outer peripheral edge blades 2b. As may be appreciated the rotatable blades 2b are suitably configured and oriented such that rotation of this further rotatable shaft (also by further means not shown) in the direction of the arrows pinches particles into the gap or space between the rotating shearing plates 4b of the blades 2b and the screen 3b. Once in this gap, cooperation between the rotating shearing plates 4b of the blades 2b and the screen 3b shears the particles into smaller size particles. The particles are continually subjected to this type of shearing size reduction until they reach a size small enough to pass through the openings of the screen 3b and pass out the unit outlet.

EXAMPLE 1

Preparation of Coalescing Agent (i.e. Foam Particles)

A starting slab of suitable foam material may be reduced to a particulate form of suitable size for the purposes of the present invention by exploiting two size reduction (i.e. ripping or shredding) stages and if desired or necessary followed by a particle sizing stage (not shown); namely, by exploiting a first size reduction step followed by a second size reduction step. As desired or necessary the particle product of the second size reduction step may be divided so as to remove undersize and oversize particles so as to obtain a batch of particles of desired predetermined size (i.e. desired size distribution).

First Size Reduction Step:
Accordingly a first stage size reduction may comprise feeding a slab of foam material (e.g. a slab having the following dimensions: 1.5"×10"×109" ("=inches) to a granulator shown in FIG. 12. The granulator as described above is a rotary cutting and shearing device equipped with suitable blades—namely, 2 stationary blades 2a and 3a; rotatable blades 3a are able to be rotated at a speed of 600 rpm with a gap of about 0.006"-0.008" between the rotary blades and the stationary blades. The granulator is also provided with an internal output screen 4a of 10 inch diameter and 12.3125 inch width composed of 5/16 inch diameter openings; the output screen is configured so as to obtain from the granulator an intermediate particulate material, the particles of which are of a size allowing the particles to pass through the 5/16 inch openings. The granulator also has a feeding mechanism (see above) whereby foam material may enter the cutting chamber at constant speed of 1.2 feet per second where it is reduced into small grains of less than 5/16 inch size.

Example of a Granulometry Distribution at the Outlet of the First Granulator Obtained from Domfoam 2565:

| | Screen size (μm) | | | | | | | |
|---|---|---|---|---|---|---|---|---|
| | 6300 | 4000 | 2500 | 2240 | 1800 | 1600 | 1250 | 1120 | NA |
| Weight (% by weight of total weight of outlet product) | 14.75 | 48.06 | 23.05 | 1.90 | 4.19 | 1.34 | 2.31 | 0.0 | 4.41 |

Second Size Reduction Step:

Particles from the first stage size reduction may be fed to a second granulator as shown in FIG. 13. The second granulator is a shearing device equipped with 4 longitudinally extending rows of shearing plates (having a total of 18 plates) able to be rotated at a speed of 3500 rpm with a gap between the blades and the screen 3b of 0.500". The second granulator is provided with an internal output screen of 10.5 inch diameter and 9 inch width composed of 3/16 inch diameter openings; the output screen is configured so as to obtain from the second granulator a particulate product the particles of which are of a size allowing the particles to pass through the 3/16 inch openings. Then the obtained particles enter a second granulator at the same speed of 1.2 feet per second.

Example of a Granulometry Distribution at the Outlet of the Second Granulator Obtained from Domfoam 2565:

| | Screen size (μm) | | | | | | | |
|---|---|---|---|---|---|---|---|---|
| | 6300 | 4000 | 2500 | 2240 | 1800 | 1600 | 1250 | 1120 | NA |
| Weight (% by weight of total weight of outlet product) | 0.0 | 12.13 | 51.66 | 4.94 | 10.03 | 3.66 | 5.68 | 1.52 | 10.63 |

If Desired or Necessary a Particle Size Grading Step:

The particulate product of step 2 above may as necessary or desired be passed through a Mechanical sieve shaker machine with tapper from ROTO TAP, US to obtain, for example, a particulate material wherein at least 85% by weight of the particles thereof comprise particles having a particle size in the range of from 1120 to 4000 Microns.

The starting foam may for example be:

a) DOMFOAM product No. 2565 treated as above described so as to obtain a final particulate product for charging to a cartridge having the following particle size distribution:

Example of a Granulometry Distribution at the Outlet of the Second Granulator Obtained from Domfoam 2565:

| | Screen size (μm) | | | | | | | |
|---|---|---|---|---|---|---|---|---|
| | 6300 | 4000 | 2500 | 2240 | 1800 | 1600 | 1250 | 1120 | NA |
| Weight (% by weight of total weight of outlet product) | 0.0 | 12.13 | 51.66 | 4.94 | 10.03 | 3.66 | 5.68 | 1.52 | 10.63 | b) DOMFOAM product No. 2545 treated as above described so as to obtain a final particulate product for charging to a cartridge having the following particle size distribution:

Example of a Granulometry Distribution at the Outlet of the Second Granulator Obtained from Domfoam 2545:

| | Screen size (μm) | | | | | | | |
|---|---|---|---|---|---|---|---|---|
| | 6300 | 4000 | 2500 | 2240 | 1800 | 1600 | 1250 | 1120 | NA |
| Weight (% by weight of total weight of outlet product) | 0.0 | 14.82 | 43.37 | 3.03 | 11.38 | 4.75 | 6.7 | 1.18 | 14.78 | c) DOMFOAM product No. 1095 treated as above described so as to obtain a final particulate product for charging to a cartridge having the following particle size distribution:

Example of a Granulometry Distribution at the Outlet of the Second Granulator Obtained from Domfoam 1095:

| | Screen size (μm) | | | | | | | |
|---|---|---|---|---|---|---|---|---|
| | 6300 | 4000 | 2500 | 2240 | 1800 | 1600 | 1250 | 1120 | NA |
| Weight (% by weight of total weight of outlet product) | 0.0 | 29.31 | 48.36 | 4.11 | 6.88 | 2.45 | 4.24 | 1.16 | 3.49 |

EXAMPLE 2

Preparation of Compressed (Foam) Particles in a Cartridge Having an Annular Charge or Storage Space Referring to FIG. 14 the compaction device has a support 200 for seating one end of a cartridge 202 as described herein (i.e. the end closed off by a respective end cap element). The upper uncapped end of the cartridge 202 (suitably) engages the lower end 204 of a chute member 206 in tight fashion (e.g. male to female engagement, screw type engagement, etc.) to inhibit the radial escape of particles during compaction of particles into the cartridge annular holding space. The upper open end of the chute member 206 engages or terminates in a delivery surface (see adjacent operator hands in FIG. 14) for feeding particles to the upper opening of the chute member 206. The delivery surface may if desired be given a flattened funnel like configuration (i.e. a downwardly sloped surface sloping toward the upper opening of the chute member 206) for facilitating the manual pushing of particles into the upper opening of the chute member for ultimate charging of particles into the cartridge annular space. The example compaction device is shown as having a compression head 208 of annular configuration, i.e. the compression head has a central opening sized to accommodate the passage therein of the inner tubular component of the cartridge. The compression head 208 is connected at an upper end to a press piston member 210 configured in any suitable manner for (controlled) urging of the compression head downward into the chute member to (volumetrically) compress the particles 209 into the cartridge annular holding space.

The filing of a cartridge may be achieved in stages by dividing a predetermined weight of particles into desired weight portions (e.g. each weight portion being place in a respective bucket). Each weight portion may then, in sequence, be fed into the press chute member 206, the press piston 210 activated and the portion of the particles volumetrically compressed (by a predefined stroke of the compression head 208) to form respective predetermined particle strata (for example as shown per the table below). The number of strata may be predetermined according to the desired density distribution it may be desired to have in the cartridge. Compression force may be captured by load cells and recorded to control uniformity and cartridge quality—is it possible to specify what the compression force is that is being applied to the particles in the loaded cartridge After the last quantity of particles is introduced and compressed into the cartridge the cover end cap element is then installed to complete the cartridge assembly.

The following Strata table gives an example of the number of steps, the amount of material and the total height of compaction at the end of each strata forming step of the filing process of an example particle charged cartridge wherein the annular holding space has a height of 19.5 inches an outer (i.e. inner) ring diameter of 6 inches and an inner ring diameter of 2 inches. The final total height of the strata for the example charged cartridge is 19.5 inches for a total weight of particles of 2.036 Kg of particles. The particles may be particles of DOMFOAM product No. 2565 treated as above described so as to having above mentioned particle size distribution.

| Strata | Weight proportion % | Height (Inch) | Qty of RPA Kg |
|---|---|---|---|
| | | 8 Strata | |
| 1 | 12.5 | 2.4300 | 0.2545 |
| 2 | 12.5 | 4.8750 | 0.2545 |
| 3 | 12.5 | 7.3125 | 0.2545 |
| 4 | 12.5 | 9.7500 | 0.2545 |
| 5 | 12.5 | 12.1875 | 0.2545 |
| 6 | 12.5 | 14.6250 | 0.2545 |
| 7 | 12.5 | 17.0625 | 0.2545 |
| 8 | 12.5 | 19.5000 | 0.2545 |
| | 1.000 | | 2.03600 |

EXAMPLE 3

Testing of Compressed Particles for Oil Separation Efficacy

A number of tests were carried out using a separator system (of the type as set forth and described with respect to FIG. 11) for the separation of an (immiscible) oil from water; the test systems used a cartridge tower comprising a single cartridge as described herein. The outer wall of the test systems encircling each of the cartridges was of Plexiglas material for allowing visual observation of the (downstream) water treated by the respective cartridge. The testing device or system used a recirculation principle. A master tank is filled up with water. A pipe goes from the tank to an oil injection point. Oil is continuously added at a precised rate using a peristaltic pump to generate a concentration of normally less than 1000 PPM. A centrifuge pump pumps the mixture and creates a fine emulsion by shearing the fluid.

Then the fluid is sent to the Cartridge tower to coalesce and separate the oil and water before the treated water is returned to the master tank. The non coalesced oil is send back to the master tank with the water. By re circulating the non coalesced oil, as the test progress in time, the oil in to the water concentration constantly increase at the inlet of the cartridge tower and the fluid become more and more difficult to threat. The testing devise simply magnify performance difference between different cartridges. A Turner designs T D 500D (from Turner Designs Hydrocarbon instruments, Houston, Tex., USA) was used to measure hydrocarbon content in the water output (130—FIG. 11); a Visual Process Analyser (ViPa) (from Jorin's UK) was also used to measure hydrocarbon content in the water input (124—FIG. 11) as well as the water output (130—FIG. 11); the water inlet flow rate was set at 3.3 m²/hour; and the hydrocarbon contaminant used was Brent Blend (UK).

The single cartridge of the separator system was, on the one hand, a cartridge (as described herein) charged with particles of the present invention and, on the other hand, a cartridge (also as described herein) charged with a previously known type of coalescing particulate material.

The cartridges in each case were charged or filled with particles using the charging technique described above in example 2 (i.e. in each case 8 strata); the starting foam material was either one in accordance with the present invention (hereinafter also designated generally as an RPA5 product) namely one of the above mentioned DOMFOAM products No. (RPA5) 2565, (RPA5) 2545, (RPA5) 1095 or was another type of particulate material designated herein as RPA3 obtained from a polyurethane foam material obtained from Plastique GYF Ltd., St Jean Sur Richelieu, Quebec, Canada and having the following characteristics:

| Parameter | (RPA5) 2565 | (RPA5) 2545 | (RPA5) 1095 | RPA3 |
|---|---|---|---|---|
| IFD no. | 55-65 | 42-48 | 98-125 | 125-140 |
| BR no. | 40 | 45 | 35 | 35 |
| SF no. | 2.1 | 2.1 | 2.1 | $\approx$1.2*[1] |
| Density (kg/m³) | 40.0461 | 40.0461 | 16.0185 | 52.5406 |
| Particle size distribution | >85% between 4000-1120 | >85% between 4000-1120 | >85% between 4000-1120 | >80% between 1120-450 |

*[1] $\approx$ = approximately

The particles used for testing were as follows:
a) 2.036119 kg of (RPA 5) particles of the present invention: i.e. particles of DOMFOAM product No. 2565 treated as above described so as to having the following particle size distribution: Example of a granulometry distribution at the outlet of the second granulator obtained from Domfoam 2565:

| Screen size (μm) | | | | | | | | |
|---|---|---|---|---|---|---|---|---|
| 6300 | 4000 | 2500 | 2240 | 1800 | 1600 | 1250 | 1120 | NA |
| 0.0 | 12.13 | 51.66 | 4.94 | 10.03 | 3.66 | 5.68 | 1.52 | 10.63 |

Weight (% by weight of total weight of outlet product)

and b) 2.036 kg of (RPA 3) particles of type previously known: i.e. particles of GYF Quebec treated as above described so as to having the following particle size distribution: Example of a granulometry distribution at the outlet of the second granulator obtained from GYF RPA 3:

| Screen size (μm) | | | | | | | | | | | |
|---|---|---|---|---|---|---|---|---|---|---|---|
| 6300 | 4000 | 2500 | 2240 | 1800 | 1600 | 1250 | 1120 | 800 | 600 | 450 | NA |
| 0.0 | 0.0 | 0.0 | 0.0 | 0.03 | 0.04 | 0.84 | 12.28 | 51.77 | 3.94 | 15.86 | 15.25 |

Weight (% by weight of total weight of outlet product)

The results are shown in the following tables:

RPA 3 Test 1:

| RPA 3 particles - test #1 | | | | | | |
|---|---|---|---|---|---|---|
| Cartridge containing RPA 3 | TD500 (PPM) | Vipa (PPM) | | Pressure (psi) | | |
| Total flow (m³) | Outlet | Inlet (×10) | Outlet | Inlet | Outlet | Difference (Delta) |
| 8.63 | 52.5 | 28.56 | 89.8 | 6.40 | 2.0 | 4.40 |
| 13.04 | 25.5 | 44.71 | 71.3 | 6.00 | 2.0 | 4.00 |

RPA 3 Test 2:

| RPA 3 particles - test #2 | | | | | | |
|---|---|---|---|---|---|---|
| Cartridge containing RPA 3 | TD500 (PPM) | Vipa (PPM) | | Pressure (psi) | | |
| Total flow (m³) | Outlet | Inlet (×10) | Outlet | Inlet | Outlet | Difference (Delta) |
| 5.16 | 43.7 | 57.66 | 153.0 | 7.60 | 3.1 | 4.46 |
| 10.7 | 49.3 | 58.51 | 65.7 | 6.50 | 2.4 | 4.10 |

RPA 5 Test 3:

| RPA 5 particles - test #3 | | | | | | |
|---|---|---|---|---|---|---|
| Cartridge containing RPA 5 | TD500 (PPM) | Vipa (PPM) | | Pressure (psi) | | |
| Total flow (m³) | Outlet | Inlet (×10) | Outlet | Inlet | Outlet | Difference (Delta) |
| 8.36 | 6.9 | 47.75 | 3.7 | 7.60 | 2.0 | 5.60 |
| 13.43 | 6.6 | 52.68 | 5.7 | 7.00 | 2.0 | 5.00 |

It can be easily seen (from either the VIPA or the TD500) that for the oil in water concentration at the outlet of the vessels, the oil in water concentrations obtained at the outlet of the RPA3 cartridges are significantly higher than those obtained at the outlet of the RPA5 cartridge (see the FIGS. 15, 16 and 17 which respectively illustrate a Graphic 1, a Graphic 2 and a Graphic 3; these Graphics are graphs showing relative efficiencies of RPA3 and RPA5 coalescing cartridges). The average oil in water concentration for the RPA3 cartridges is greater than the one obtained with the RPA5 cartridge (37.4 ppm against 6.6 ppm). It was also observed that the water in the systems on the downstream side of the RPA3 cartridges got foggy very soon after the beginning of the test, whereas the water downstream of the RPA5 cartridge stayed relatively clear for 6 hours.

The invention claimed is:

1. A coalescing agent for facilitating the separation of a non-aqueous phase from an aqueous phase of an aqueous medium, said agent consisting of particles of a polymeric foam material having:
   an IFD no. of 40 or higher (i.e. at least 40);
   a BR no. of 35 or higher (i.e. at least 35);
   a SF no. of 1.8 or higher (i.e. at least 1.8); and
   a density of 42 kg/m³ or less.

2. A coalescing agent as defined in claim 1 wherein said polymeric foam material is selected from the group of foam materials consisting of polyurethane foam, polystyrene foam, polypropylene foam, polyester foam, and polyethylene foam.

3. A coalescing agent as defined in claim 1 wherein said agent comprises particles of a polymeric foam material having:
   an IFD no. of from 40 to 125; and
   a density of 30 kg/m³ or less.

4. A coalescing agent as defined in claim 1 wherein said agent comprises particles of a polymeric foam material having an IFD no. of from 90 to 125.

5. A coalescing agent as defined in claim 1 wherein said agent comprises particles of a polymeric foam material having an IFD no. of from 50 to 95.

6. A coalescing agent as defined in claim 1 wherein said agent comprises particles of a polymeric foam material having a BR no. of from 35 to 55.

7. A coalescing agent as defined in claim 1 wherein said agent comprises particles of a polymeric foam material having an SF no. of from 1.8 to 2.5.

8. A coalescing agent as defined in claim 1 to 7 wherein at least 85% by weight of said particles comprises particles having a particle size in the range of from 1120 to 4000 microns.

* * * * *